(12) United States Patent
Wernimont et al.

(10) Patent No.: US 12,402,603 B2
(45) Date of Patent: Sep. 2, 2025

(54) WEARABLE ANIMAL INFORMATION APPARATUS

(71) Applicant: Hill's Pet Nutrition, Inc., Topeka, KS (US)

(72) Inventors: Susan Wernimont, Lawrence, KS (US); Ryan Talley, Topeka, KS (US); Janae Michelle Bradley, Topeka, KS (US)

(73) Assignee: Hill's Pet Nutrition, Inc., Overland Park, KS (US)

( * ) Notice: Subject to any disclaimer, the term of this patent is extended or adjusted under 35 U.S.C. 154(b) by 0 days.

(21) Appl. No.: 18/537,267

(22) Filed: Dec. 12, 2023

(65) Prior Publication Data

US 2024/0196863 A1  Jun. 20, 2024

Related U.S. Application Data

(60) Provisional application No. 63/433,142, filed on Dec. 16, 2022.

(51) Int. Cl.
*A01K 27/00* (2006.01)
*A01K 29/00* (2006.01)

(52) U.S. Cl.
CPC .......... *A01K 27/001* (2013.01); *A01K 29/005* (2013.01)

(58) Field of Classification Search
CPC ................ A01K 27/001; A01K 29/005; A01K 27/005–009; A44C 5/14; A44C 5/145;

(Continued)

(56) References Cited

U.S. PATENT DOCUMENTS 4,174,553 A * 11/1979 Schrougham ........ A44B 11/226
24/321
4,309,797 A * 1/1982 Schrougham ........ A44B 11/226
40/303

(Continued)

FOREIGN PATENT DOCUMENTS

EM  008266795-0001  11/2020
EP  2505056  10/2012

(Continued)

OTHER PUBLICATIONS

International Search Report and the Written Opinion of the International Searching Authority issued in International Application PCT/US2023/083633 mailed Apr. 5, 2024.

*Primary Examiner* — Joshua J Michener
*Assistant Examiner* — Nicole Paige MacCrate

(57) ABSTRACT

A sensor apparatus configured for attachment to a collar worn by an animal. The sensor apparatus may include a housing having a first connection feature configured for coupling the sensor apparatus to a first type of animal collar. The first connection feature may be an integral part of the housing. The housing may define a cavity. The sensor apparatus may further include an adaptor assembly configured to be coupled to the housing. The adaptor assembly may include a second connection feature configured for coupling the sensor apparatus to a second type of animal collar that is different from the first type of animal collar. For example, the first type of animal collar may be a nylon collar and the second type of animal collar may be a metal collar. An electronic circuit may be located within the cavity of the housing to store information and/or collect data.

20 Claims, 23 Drawing Sheets

(58) Field of Classification Search
CPC ............... A44C 5/147; G04B 37/1486; G04B 37/1493; G04B 37/16
See application file for complete search history.

(56) References Cited

U.S. PATENT DOCUMENTS

| | | | |
|---|---|---|---|
| 6,205,956 B1 | 3/2001 | Dickie et al. | |
| 7,174,857 B2 | 2/2007 | Lord | |
| 7,574,979 B2* | 8/2009 | Nottingham | A01K 27/005 |
| | | | 119/859 |
| 7,914,306 B1 | 3/2011 | Blackwell | |
| 8,701,600 B2 | 4/2014 | Dutcher et al. | |
| 8,783,212 B2 | 7/2014 | Bellon et al. | |
| 8,919,293 B2 | 12/2014 | Cromwell et al. | |
| 8,960,948 B2 | 2/2015 | Ford | |
| 9,332,812 B2 | 5/2016 | Ma | |
| 9,615,546 B2 | 4/2017 | Pantazes | |
| 9,785,121 B2 | 10/2017 | Brown et al. | |
| 9,861,080 B1 | 1/2018 | Hathway et al. | |
| 9,883,657 B2 | 2/2018 | So | |
| 9,894,884 B2 | 2/2018 | Hill et al. | |
| 10,271,524 B2 | 4/2019 | Chen | |
| 10,420,325 B2 | 9/2019 | Czarnecky et al. | |
| 10,534,900 B2 | 1/2020 | Cheong et al. | |
| 10,660,312 B2 | 5/2020 | Leach et al. | |
| 10,687,514 B2 | 6/2020 | Sheldon et al. | |
| 10,791,715 B1 | 10/2020 | Rotberg | |
| 10,912,282 B2 | 2/2021 | McKee et al. | |
| 11,140,872 B2 | 10/2021 | Kennedy et al. | |
| 11,172,649 B2 | 11/2021 | Brayer et al. | |
| D957,763 S | 7/2022 | Jia | |
| 2002/0011219 A1 | 1/2002 | Chien | |
| 2002/0070252 A1* | 6/2002 | Bauer | G04B 37/1486 |
| | | | 224/175 |
| 2007/0221140 A1 | 9/2007 | Warren et al. | |
| 2007/0256284 A1* | 11/2007 | Bauer | A44C 5/16 |
| | | | 24/265 WS |
| 2008/0163827 A1 | 7/2008 | Goetz | |
| 2012/0168471 A1* | 7/2012 | Wilson | G04B 37/1486 |
| | | | 224/152 |
| 2014/0378853 A1 | 12/2014 | McKinney et al. | |
| 2015/0099472 A1* | 4/2015 | Ickovic | H04W 64/006 |
| | | | 455/66.1 |
| 2015/0342308 A1* | 12/2015 | Wilson | G04B 37/1486 |
| | | | 224/219 |
| 2016/0050890 A1 | 2/2016 | Fitzgerald et al. | |
| 2016/0223992 A1* | 8/2016 | Seo | G04G 19/00 |
| 2017/0035190 A1* | 2/2017 | Gilmore | A44C 5/0053 |
| 2018/0011448 A1* | 1/2018 | Von Allmen | G04B 37/1493 |
| 2018/0049409 A1 | 2/2018 | Sporn | |
| 2018/0070840 A1 | 3/2018 | Cronin et al. | |
| 2018/0098525 A1* | 4/2018 | Lee | A01K 27/001 |
| 2018/0125038 A1* | 5/2018 | Hord | G08B 15/00 |
| 2019/0133084 A1* | 5/2019 | Landers | G08B 21/0269 |
| 2019/0304345 A1* | 10/2019 | Stapleton | G09F 3/08 |
| 2019/0350169 A1 | 11/2019 | Weinrauch et al. | |
| 2020/0015456 A1 | 1/2020 | Van Curen et al. | |
| 2020/0229552 A1* | 7/2020 | Amsalem | G04G 17/02 |
| 2021/0227795 A1 | 7/2021 | Rust | |
| 2021/0274754 A1 | 9/2021 | Talley et al. | |
| 2022/0030833 A1 | 2/2022 | Kennedy et al. | |
| 2022/0125019 A1* | 4/2022 | Park | A01K 11/00 |
| 2022/0151207 A1 | 5/2022 | Mott et al. | |
| 2023/0320321 A1* | 10/2023 | Hipsley | A01K 27/009 |
| | | | 119/859 |
| 2023/0389522 A1* | 12/2023 | Koo | A01K 27/00 |

FOREIGN PATENT DOCUMENTS

| | | |
|---|---|---|
| GB | 2579241 | 6/2020 |
| WO | 2015/100503 | 7/2015 |
| WO | 2018/197849 | 11/2018 |
| WO | 2019/203608 | 10/2019 |
| WO | 2021/123791 | 6/2021 |

* cited by examiner

WEARABLE ANIMAL INFORMATION APPARATUS

CROSS-REFERENCE TO RELATED APPLICATIONS

The present application claims priority to U.S. Provisional Patent Application Ser. No. 63/433,142, filed Dec. 16, 2022, the entirety of which is incorporated herein by reference.

BACKGROUND

Animal collars are used for various reasons, such as to allow an animal to be constrained or controlled by an animal owner. As animal collars are regularly worn by an animal, identification of the animal wearing the animal collar may be provided. Such information may include the name of the animal, pet owner information, as well as other information related to the animal or pet owner. The information may be provided via non-electronic or electronic devices. Typically, however, non-electronic devices are limited in the amount of information that may be conveyed. Further, such devices are subject to degradation over time.

Electronic devices have been provided to overcome some of the deficiencies of the non-electronic tags. For example, electronic devices have been used to store information relating to an animal or an animal owner. Conventional electronic devices, however, are only capable of being used on a specific type of collar, which may reduce their accessibility. Thus, a need exists for a sensor apparatus or wearable animal information apparatus with the capability of being used with different types of animal collars.

BRIEF SUMMARY

A sensor apparatus configured for attachment to a collar worn by an animal. The sensor apparatus may include a housing having a first connection feature configured for coupling the sensor apparatus to a first type of animal collar. The first connection feature may be an integral part of the housing. The housing may define a cavity. The sensor apparatus may further include an adaptor assembly configured to be coupled to the housing. The adaptor assembly may include a second connection feature configured for coupling the sensor apparatus to a second type of animal collar that is different from the first type of animal collar. For example, the first type of animal collar may be a nylon collar and the second type of animal collar may be a metal collar. An electronic circuit may be located within the cavity of the housing to store information and/or collect data.

In one aspect, the invention may be a sensor apparatus configured for attachment to a collar worn by an animal, the sensor apparatus comprising: a sensor apparatus comprising: a housing comprising a first connection feature configured for coupling the sensor apparatus to a first type of animal collar, the housing defining a cavity; and an electronic circuit located within the cavity of the housing, wherein the electronic circuit is configured to at least one of store information and collect data; and an adaptor assembly configured to be coupled to the housing, the adaptor assembly comprising a second connection feature configured for coupling the sensor apparatus to a second type of animal collar that is different from the first type of animal collar;.

In another aspect, the invention may be a wearable animal information apparatus comprising: a sensor apparatus comprising: a housing comprising a first connection feature; an adaptor assembly configured to be coupled to the housing, the adaptor assembly comprising a second connection feature; and an electronic circuit located within a cavity of the housing, wherein the electronic circuit is configured to at least one of store information and collect data; a first type of collar configured to be coupled to the sensor apparatus utilizing the first connection feature of the housing, wherein the first type of collar is incapable of attachment to the second connection feature of the adaptor assembly; and a second type of collar configured to be coupled to the sensor apparatus utilizing the second connection feature of the adaptor assembly, wherein the second type of collar is incapable of attachment to the first connection feature of the housing.

BRIEF DESCRIPTION OF THE DRAWINGS

The present disclosure will become more fully understood from the detailed description and the accompanying drawings, wherein.

DETAILED DESCRIPTION

Figure 1:
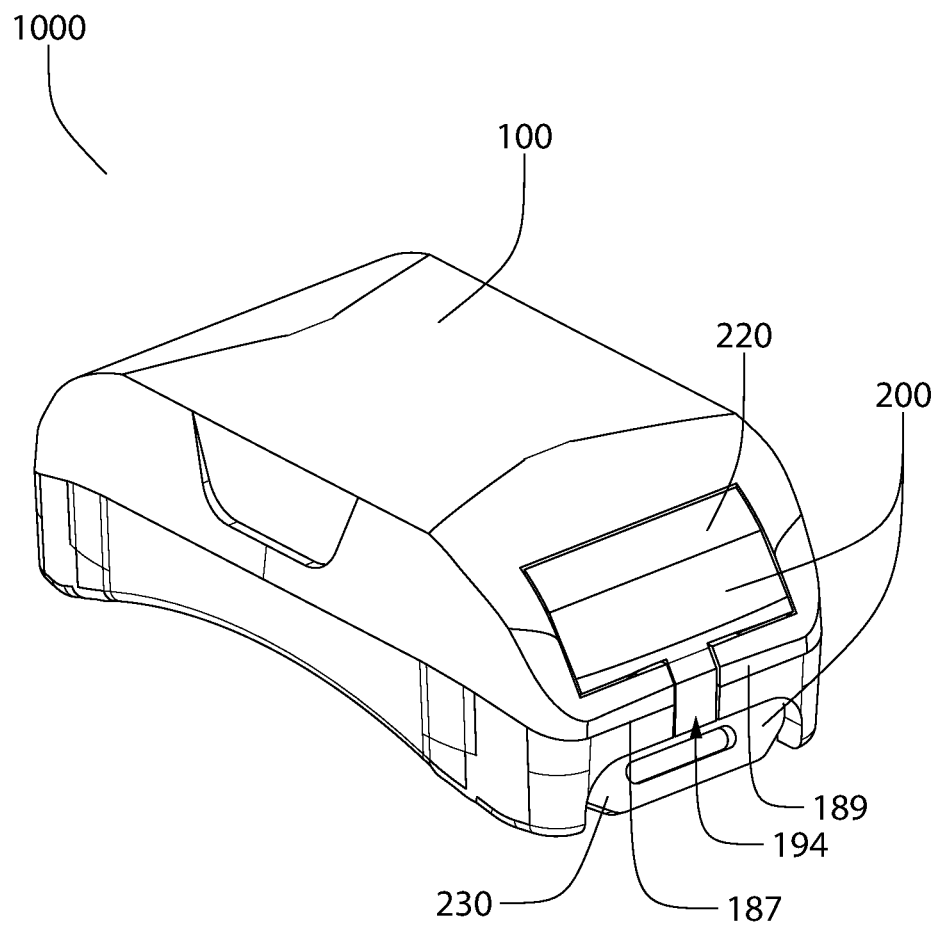
FIG. 1 is a perspective view of a sensor apparatus in accordance with an embodiment of the present invention.

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present inventions. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require a particular orientation unless explicitly indicated as such. Terms such as "attached," "affixed," "connected," "coupled," "interconnected," "secured" and other similar terms refer to a relationship wherein structures are secured or attached to one another either directly or indirectly through intervening structures, as well as both movable or rigid attachments or relationships, unless expressly described otherwise.

The discussion herein describes and illustrates some possible non-limiting combinations of features that may exist alone or in other combinations of features. Furthermore, as used herein, the term "or" is to be interpreted as a logical operator that results in true whenever one or more of its operands are true. Furthermore, as used herein, the phrase "based on" is to be interpreted as meaning "based at least in part on," and therefore is not limited to an interpretation of "based entirely on."

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Features of the present inventions may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth (e.g., Bluetooth classic, Bluetooth low energy), LAN, etc.

In certain embodiments, the present invention may include computer-implemented processes and apparatuses such as processor-based data processing and communication systems or computer systems for practicing those processes. The present inventions may also include software or computer program code embodied in a non-transitory computer-readable storage medium, which when loaded into and executed by the data processing and communications systems or computer systems, the computer program code segments configure the processor to create specific logic circuits configured for implementing the processes.

Figure 2:
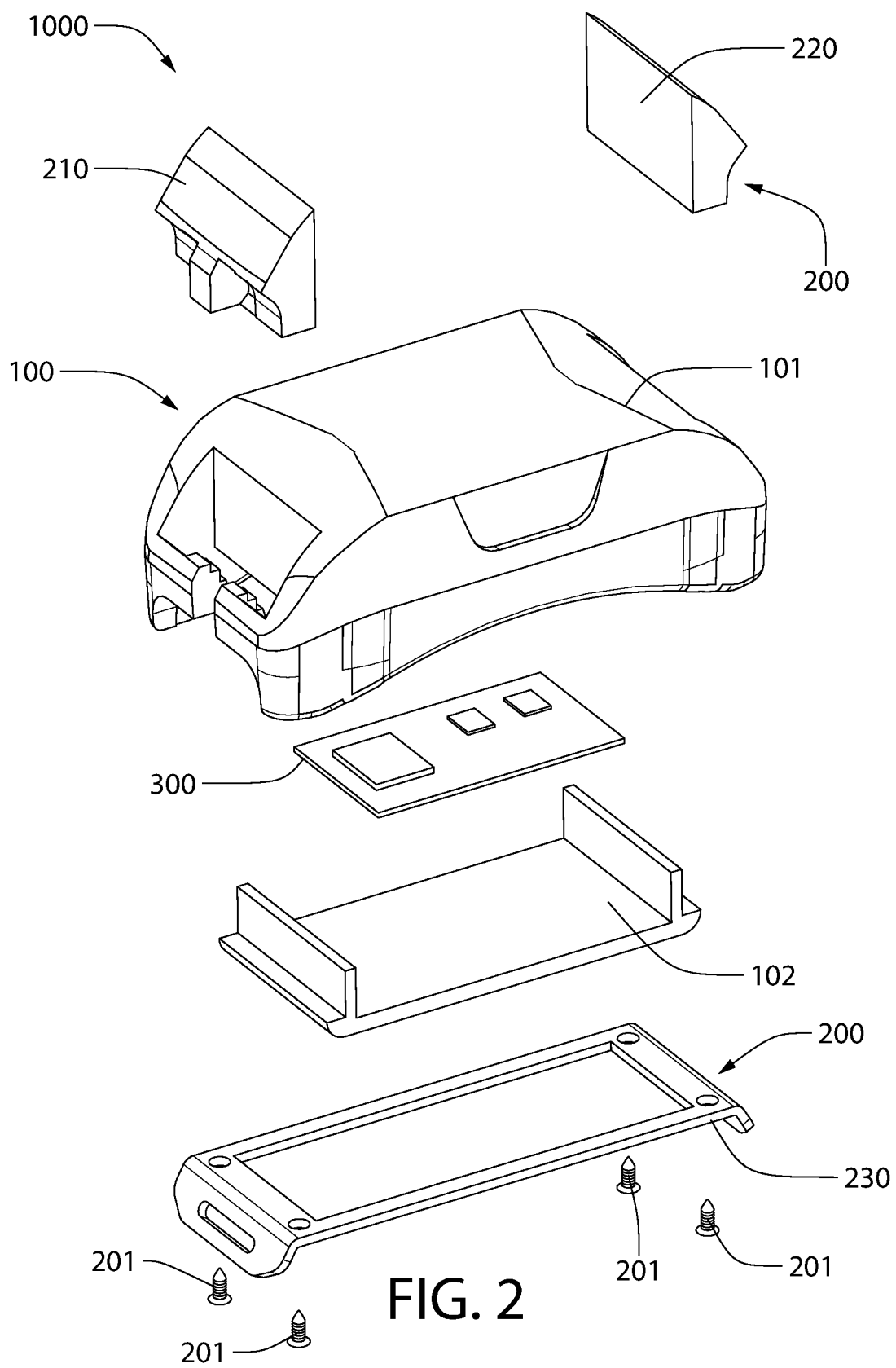
FIG. 2 is an exploded perspective view of the sensor apparatus of FIG. 1.

Referring now to FIGS. 1 and 2, a sensor apparatus 1000 is illustrated in accordance with an embodiment of the present invention. The sensor apparatus 1000 may be designed and configured to facilitate its attachment to different types or styles of animal collar. Briefly, an animal collar is a loop-like structure which is configured to be placed around an animal's neck. Often, the collar is used as an attachment point for a leash or lead so that an animal owner can walk with the animal in outdoor environments without fear of the animal becoming loose. The collar may also include physical tags attached thereto containing information about the animal (name), the owner of the animal (name, telephone number, address), and any other information desired to be conveyed. The sensor apparatus 1000 may be attached to the collar as an alternative to, or in addition to, any non-electronic identifying information located on the collar. As described herein, the sensor apparatus 1000 may be designed in a way which enables it to be attached to different types of collars. For example, a nylon collar may be able to be attached to the sensor apparatus 1000 in a specific manner while a metal collar is incapable of being attached to the sensor apparatus 1000 in the same way. Thus, the sensor apparatus 1000 includes features which allow for its attachment to nylon and metal collars, for example, using different structural features of the sensor apparatus 1000, as described further herein.

The sensor apparatus 1000 may comprise a housing 100 and an adaptor assembly 200 that is configured to be attached to the housing 100. The housing 100 may be configured for coupling to a first type of animal collar without the adaptor assembly 200. That is, if it is desired to use the sensor apparatus 1000 with a first type of animal collar (e.g., one formed from a material such as nylon, polyester, neoprene, rubber, elastomer, and leather), this may be accomplished without coupling the adaptor assembly 200 to the housing 100. However, when it is desired to use the sensor system 1000 with a second type of animal collar (e.g., one formed from metal), then the adaptor assembly 200 may first be coupled to the housing 100 and the second type of animal collar may be coupled to the sensor apparatus 1000 via the adaptor assembly 200 or a portion thereof.

The housing 100 may include a housing body 101 and a housing cover 102. The housing body 101 may define a cavity 107, as best shown in FIG. 4D. An electronic circuit 300 may be located or contained within the cavity. The electronic circuit 300 is depicted generically in FIG. 2 and will be described in greater detail with reference to FIG. 3. The housing 100 and the electronic circuit 300 may collectively be referred to herein as a sensor assembly. Thus, the sensor apparatus 1000 may comprise a sensor assembly which comprises the housing 100 and the electronic circuit 300 and the sensor apparatus 1000 may further comprise the adaptor assembly 200.

The housing cover 102 may be detachably coupled to the housing body 101 to selectively open and close an open bottom end of the cavity 107. The housing body 101 and the housing cover 102 may include various engagement features to facilitate the attachment of the two parts together as is well known in the art. This may be useful for placing various electronic components inside of the cavity and/or for replacing parts as they require replacement. For example, the electronic circuit 300 may include a power source such as a battery which may need to be replaced. In alternative embodiments, the housing 100 may be a singular, monolithic structure and the cavity may not be accessible to a consumer after purchase. That is, in an alternative embodiment the cavity may be sealed closed at the time of manufacture and the electronic components contained therein may not be replaceable. In such an embodiment, the power source of the electronic circuit 300 may be a rechargeable battery which may be capable of being charged with a charging module that can be plugged into a charging port of the sensor apparatus 1000.

The adaptor assembly 200 may comprise a first plug 210, a second plug 220, and a bracket 230. The first and second plugs 210, 220 may be coupled to the housing 100 and then the bracket 230 may be coupled to the first and second plugs 210, 220. In the exemplified embodiment, the bracket 230 may be coupled to the first and second plugs 210, 220 with fasteners 201, such as screws. The first and second plugs 210, 220 may be used to cover up the holes/nesting regions in the housing 100 to prevent use thereof and/or to prevent an animal from getting their teeth caught in the empty space if the first and second plugs 210, 220 were not used. The first and second plugs 210, 220 may also be color coded to function as an indication feature. In an alternative embodiment, the bracket 230 may be coupled directly to the housing 100 using fasteners such as screws. In such an embodiment, the plugs 210, 220 may be omitted, but they also may still be included to provide a seamless housing 100 which may prevent animal teeth getting caught and provide other benefits. As mentioned above, the housing 100 of the sensor apparatus 1000 may be coupled directly to a first type of collar without attaching the adaptor assembly 200 to the housing 100. The adaptor assembly 200 may be coupled to the housing 100 to enable the sensor apparatus 1000 to be coupled to a second type of collar that is different than the first type of collar in at least one characteristic. Further details about the housing 100, the plugs 210, 220, the brackets 230, and the electronic circuit 300 will be provided below.

Figure 3:
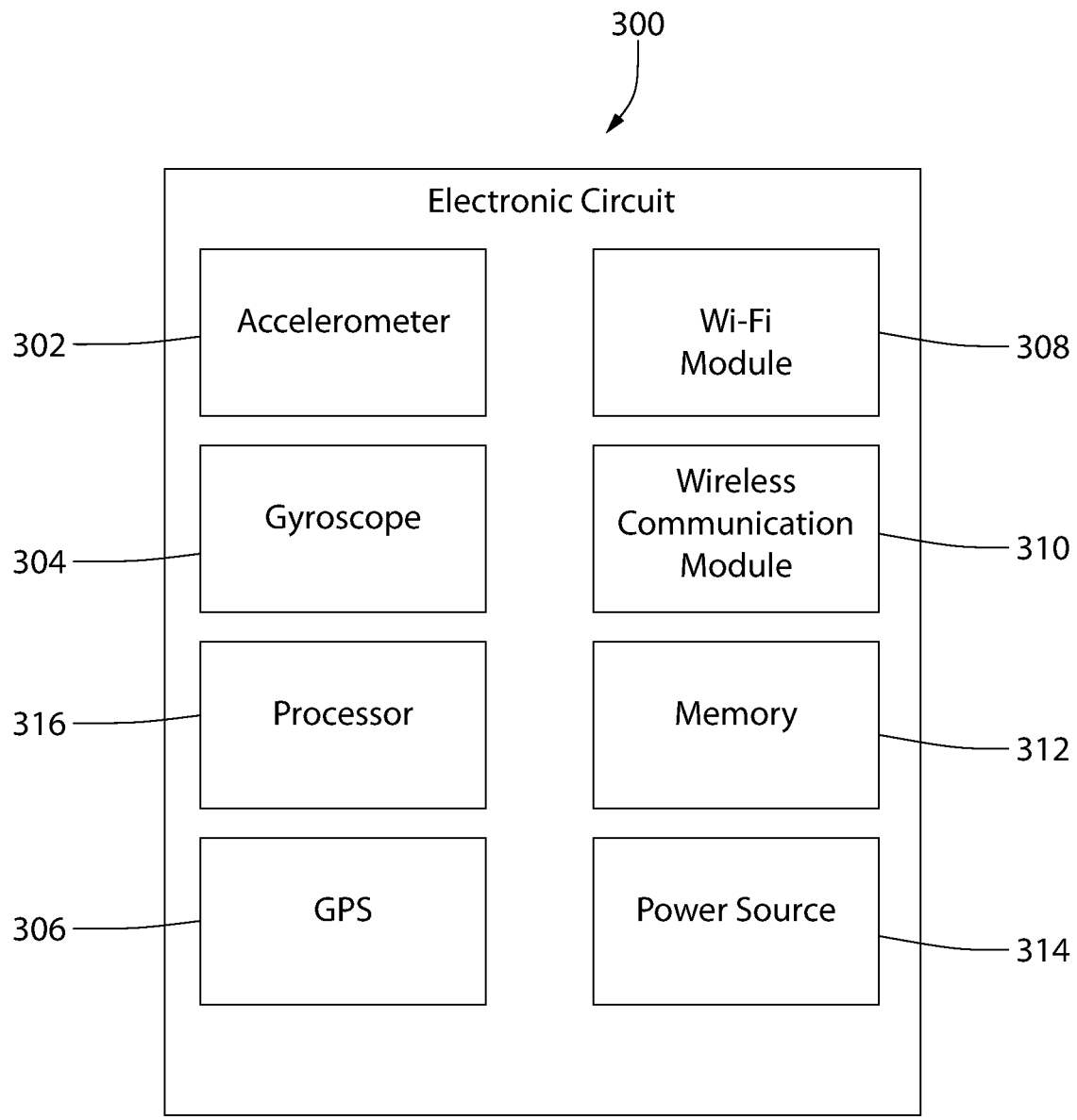
FIG. 3 is an electronic diagram of the electronic components of the sensor apparatus of FIG. 1 in accordance with an embodiment of the present invention.

FIG. 3 is a schematic diagram of the components of the electronic circuit 300 which may be housed within the cavity 107 of the housing 100 of the sensor apparatus 1000. The electronic device 200 may be used to store animal information and/or collect animal data. For example, the electronic device 200 may store information about the animal, including the animal's name, address, owner names, breed, color, size, and other identifying information. The electronic device 200 may collect animal data, which can be any data about the animal including without limitation data about the animal's movement, motion, geographic location, eating habits, sleeping habits, exercise habits, and the like. The electronic circuit 300 may determine, receive (e.g., actively receive, such as collect), and/or transmit information relating to the animal and/or the animal parent, including identification information, location information, medical information, biometric information, movement information, motion information, etc. The information may be real-time information. The electronic circuit 300 may comprise one or more processors, sensors, transponders, etc., including a combination thereof.

The electronic circuit 300 may be attached to a collar as described herein. The electronic circuit 300 may store information related to the animal wearing the collar to which the sensor apparatus 1000 which comprises the electronic circuit 300 is attached and/or track the movement and/or location of the animal. The electronic circuit 300 may comprise, without limitation, an accelerometer 302, a gyroscope 304, a Global Positioning System (GPS) 306, a Wi-Fi Module 308, a wireless communication module 310 (e.g., cellular, Bluetooth, ultrawide band), a memory 312, a power source 314, and a processor 316. The aforementioned components may be operably coupled together. In one embodiment, each of the components may be coupled to the processor 316 which can dictate the function and operation of the electronic circuit 300. In other embodiments the various components may be coupled together in other ways. The electronic circuit 300 may also include an indicator such as a speaker, a vibration element, and/or a light element which may be activated to indicate various information to an animal owner, such as battery power remaining, memory storage, data transmission information, and the like. Such indicators may also be used to aid in locating the animal.

The electronic circuit 300 may be configured for radio communication with a base station that may provide the location and/or proximity of the animal. The Global Positioning System (GPS) may be used for locating the animal at a given time or providing information related to the animal's previous whereabouts and geographic locations. The memory 312 may store information about the animal's whereabouts over time. The electronic device circuit 300 may be configured to locate the animal via one or more other tracking methods, such as via Wi-Fi location tracking, cellular location tracking, and the like.

The electronic circuit 300 may communicate with devices and/or objects other than servers and base stations, as described herein. For example, the electronic circuit 300 may communicate with other items, such as items found in a home. Such items may include, for example, pet beds, pet feeders, litter boxes, water bowls, and the like. The electronic circuit 300 may also, or alternatively, include (e.g., store) information relating to the animal and/or pet owner. The information may relate to location information or may be unrelated to location information. The information may be electronically stored and retrieved after the animal is located.

The electronic circuit 300 may identify biometric data of an animal, such as an animal's heart rate, blood pressure, temperature, hydration status, blood oxygen level, etc., to determine and/or transmit a health condition of the animal. The electronic circuit 300 may determine and/or transmit location information of the animal, for example, to determine when the animal is inside/outside of the home of the animal. The electronic circuit 300 may be used to determine environmental conditions related to an animal, for example, the weather, temperature, pollen, etc. of the environment in which the animal is located. The electronic circuit 300 may have a microphone, speaker, camera, and/or recording capability. In examples, camera may be a video/photographic camera or other type of optical sensing device configured to capture images. Camera may be configured to capture single, static images of the area and/or video images of the area. The electronic circuit 300 may have cellular, Bluetooth, Wi-Fi, or other WAN transmission capabilities, which may provide communication capabilities with an external device, such as a smartphone, tablet, server, or the like.

The electronic circuit 300 may communicate with one or more components that are external to the sensor apparatus 1000 via a Bluetooth connection using the wireless communication module. Of course, other wireless communication protocols other than Bluetooth may be used in other embodiments, including without limitation Zigbee, Z-wave, RFID, NFC, or the like.

The accelerometer 302 and/or gyroscope 304 may measure an activity and/or movement of an animal. The gyroscope 304 may measure the animal's orientation. The accelerometer 302 and the gyroscope 304 may together provide 6-axes of motion detection. In some embodiments only one of the accelerometer 302 and gyroscope 304 may be included in the electronic circuit 300.

A temperature sensor may be included as part of the electronic circuit 300 to measure the animal's body temperature. A GSR Sensor may be included to measure galvanic skin resistance (GSR). For instance, a GSR sensor may measure the amount of sweat or moisture detected on the body of the animal. The GPS 306 may identify and/or determine the location (e.g., current location or past locations) of the animal. The memory 312 may be of any size. The memory 312 may be coupled to each of the sensors to store data obtained by the sensors. The memory 312 may be operably coupled to the processor 316 and/or to a transmitter to transmit the data obtained by the sensors to an external device. The external device may be a software application residing on a computer, a smart phone, or the like.

The power source 314 may comprise one or more batteries which may be contained within (e.g., self-contained within) the cavity 107 of the housing 100. The power source 314 may supply power to each of the components of the electronic circuit 300. The power source 314 may be a rechargeable battery that can be charged by a power cord that is coupled to a wall outlet or a power source of a vehicle or the like. The power source 314 may be removable and/or modular. The power source 314 may be chargeable while the sensor apparatus 1000 is attached to the animal. For example, an interface may be provided through the housing 100 of the electronic circuit 300 that may allow the power source 314 to be charged while sensor apparatus 1000 is attached to a collar that is placed around the animal's neck. The interface may be, for example, a USB interface, induction pins, wireless charging, wireless communications, etc., that allow the power source 314 to be accessed and charged while the sensor apparatus 1000 is attached to a collar. Although a Li-Po battery may be used, such battery is for illustration purposes only and any type of battery may be used.

The electronic circuit 300 may store, receive (e.g., actively receive), and/or transmit identification information of the animal and/or pet owner. For example, the processor 316 may store, receive (e.g., actively receive), and/or transmit real-time information of the animal and/or pet owner. The processor 316 may be configured to translate and/or store data from components housed within electronic circuit 300 (e.g., accelerometer 202, gyroscope 206, magnetometer, GPS 306, etc.). The processor 316 may be configured to permit electronic circuit 300 of the sensor apparatus 1000 to function and/or assist in one or more modes, such as active mode, sleep mode, transmit mode, onboarding mode. The processor 316 may identify the animal and/or the animal owner, track the location of the animal, monitor biometric information of the animal or activity (e.g., heart rate, steps, calories burned, etc.) of the animal, and/or environmental conditions related to an animal. The electronic circuit 300 may identify such information via one or more sensors, such as accelerometers, gyroscopes, temperature sensors, heart rate sensors, magnetometers, electrocardiogram (EKG, otherwise known as ECG) electrodes, photoplethysmography (PPGs) and/or reflection mode PPGs (PPGr) sensors, or one or more other sensors of electronic circuit 300 or external to electronic circuit 300 that detect information of an animal. For example, the electronic circuit 300 may identify biometric data of the animal via biosensors to determine health indicators of the animal, such as glucose, cortisol, serotonin, scrum symmetric dimethylarginine (SDMA), and other indicators of the animal. The processor 316 may track such data over certain time periods. As an example, the processor 316 may be an ARM Cortex M0-M3, or the like.

The electronic circuit 300 may include one or more components, such as a light source. The light source may an LED light source, for example. The light source may be indicators. The light source may provide one or more indicators having one or more colors and other effects. For example, light source may have one or more light indicators that may be different colors, the same colors, or a combination of the two. The light indicators may blink at speeds (e.g., fast intervals, slow intervals), etc. The light indicators may represent aspects of the animal, such as the animal's activity (e.g., eating/drinking activity, sleeping activity, exercise activity, etc.). The light indicators may represent aspects of the environment surrounding sensor apparatus 1000, such as the weather, precipitation, moisture, humidity, and the like. The light indicators may represent aspects of sensor apparatus 1000, such as an indication of sufficient or lack of power of the power source 314, of the power source 314 being charged, and the like. The light indicators may represent data receipt and/or transmission. For example, the light indicators may represent successful data receipt and/or transmission and/or unsuccessful data receipt and/or transmission. Instead of or in addition to light indicators, the electronic circuit 300 may have speakers or vibration elements to achieve the indication functions described herein.

Thus, the electronic circuit 300 of the sensor apparatus 1000 is configured to at least one of store information and collect data using the various sensors, power sources, processors, and the like. The stored information may be information about the animal wearing the sensor apparatus 1000 or that animal's owner. The collected data may include data about the animal's geographic locations at a specific time or over a period of time, data about the animal's movements, data about the animal's biometrics and daily habits, and the like. There are numerous functions which may be achieved by the electronic circuit 300 and the invention described herein is not intended to be limited by those functions in all embodiments.

Figure 4A:
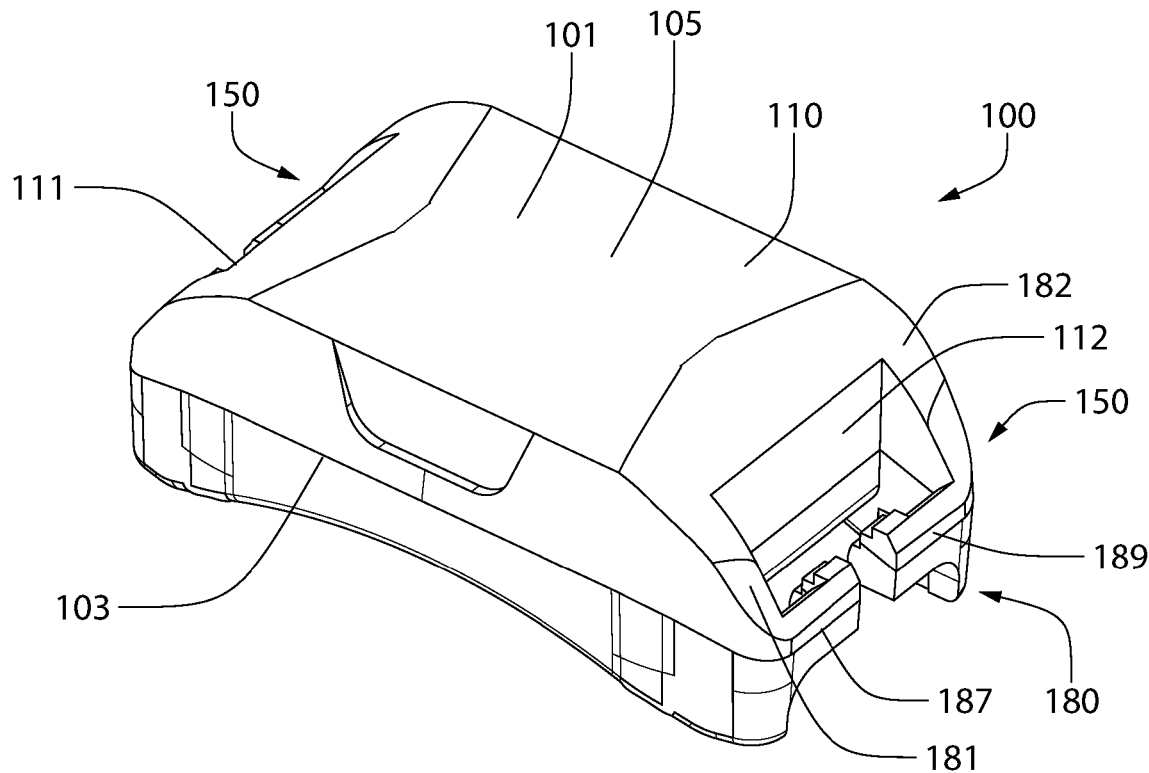
FIG. 4A is a top front perspective view of a housing of the sensor apparatus of FIG. 1.
Figure 4B:
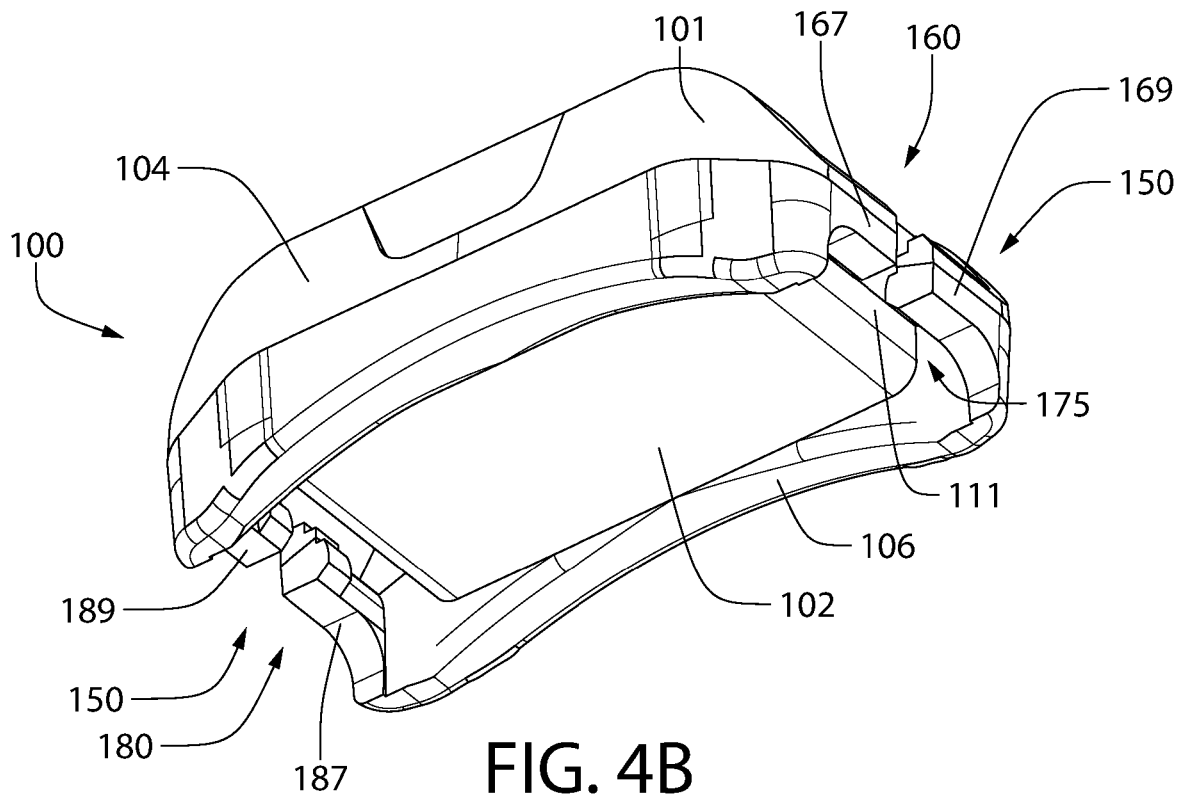
FIG. 4B is a bottom rear perspective view of the housing of FIG. 4A.
Figure 4C:
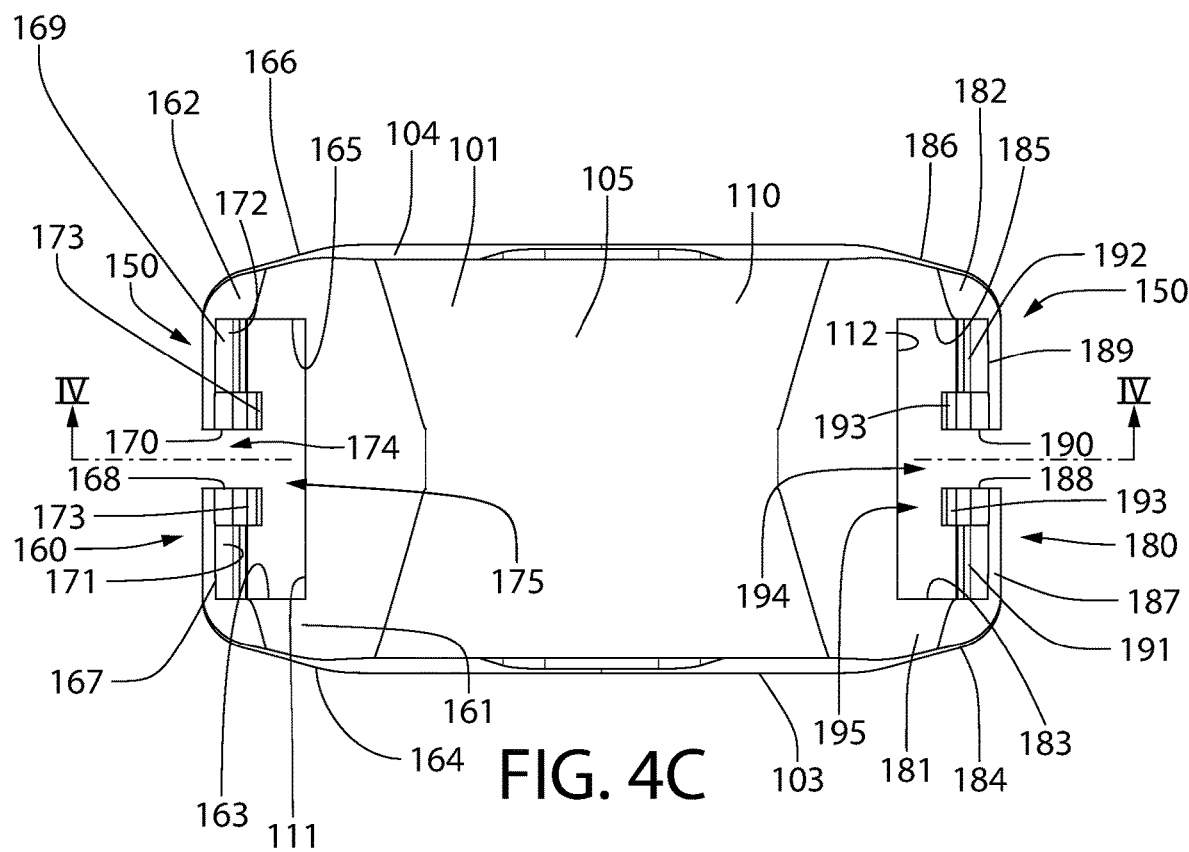
FIG. 4C is a top plan view of the housing of FIG. 4A.
Figure 4D:
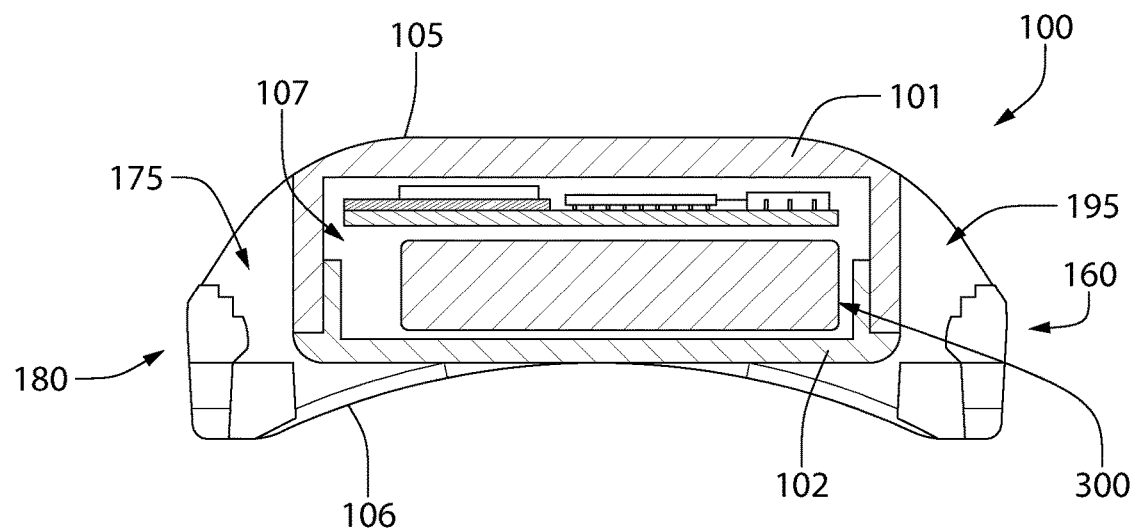
FIG. 4D is a cross-sectional view taken along line IV of FIG. 4C.

With reference to FIGS. 4A-4C, the housing 100 will be described. The housing 100 comprises the housing body 101 and the housing cover 102 as previously described. Furthermore, the housing body 101 comprises a front surface 103, a rear surface 104, a top surface 105, and a bottom surface 106. The housing body 101 may comprise a main body portion 110 and a first connection feature 150. The main body portion 110 and the first connection feature 150 may be integrally connected and formed as a singular monolithic component. The main body portion 110 may comprise a first end 111 and a second end 112 each of which extends generally between the front and rear surfaces 103, 104. The first connection feature 150 may comprise a first connector 160 extending from the first end 111 of the main body portion 110 and a second connector 180 extending from the second end 112 of the main body portion 110. The first and second connectors 160, 180 of the first connection feature 150 may both be utilized to facilitate attachment of the housing 100 to a first type of animal collar, as described herein.

The first connector 160 may comprise a first flange 161 extending from the first end 111 of the main body portion 110 at a position that is adjacent to the front surface 103 of the housing body 101 and a second flange 162 extending from the first end 111 of the main body portion 110 at a position that is adjacent to the rear surface 104 of the housing body 101. The first flange 161 may have an inner surface 163 and an outer surface 164, with the outer surface 164 being generally flush with the front surface 103 of the housing body 101. The second flange 162 may have an inner surface 165 and an outer surface 166, with the outer surface 166 being generally flush with the rear surface 104 of the housing body 101. The first and second flanges 161, 162 may extend generally perpendicularly from the first end 111 of the main body portion 110 in a spaced apart manner with the inner surfaces 163, 165 facing each other and being spaced apart from each other. The various flanges described herein may have varying widths to accommodate different size collars, from small/thin collars to very wide collars.

A first arm 167 may extend from the inner surface 163 of the first flange 161 in a direction towards the second flange 162. The first arm 167 may extend from the first flange 161 at a terminal end of the first flange 161 which is located furthest from the first end 111 of the main body portion 110. The first arm 167 may terminate in a distal end 168. The first arm 167 may be oriented perpendicularly relative to the first flange 161. A second arm 169 may extend from the inner surface 165 of the second flange 162 in a direction towards the first flange 161. The second arm 169 may extend from the second flange 162 at a terminal end of the second flange 162 which is located furthest from the first end 111 of the main body portion 110. The second arm 169 may terminate in a distal end 170.

The distal ends 168, 170 of the first and second arms 167, 169 may be spaced apart from one another by a gap 174. The first arm 167 comprises an inner surface 171 that faces the first end 111 of the main body portion 110 of the housing 100 and the second arm 169 comprises an inner surface 172 that faces the first end 111 of the main body portion 110. The inner surfaces 171, 172 of the first and second arms 167, 169 may be spaced apart from the first end 111 of the main body portion 110 such that a first nesting region 175 is defined between the first and second arms 167, 169 of the first connector 160 and the first end 111 of the main body portion 110 of the housing 100. A portion of a collar may be positioned within the first nesting region 175 when the housing 100 is coupled to the collar. The inner surfaces 171, 172 of the first and second arms 167, 169 may comprise gripping protrusions 173 extending inwardly towards the first end 111 of the main body portion 110. The gripping protrusions 173 may contact the collar to which the housing 100 is attached to prevent the housing 100 from moving substantially along the collar when in use. The gripping protrusions 173 may be formed at or adjacent to the distal ends 168, 170 of the first and second arms 167, 169, respectively. In an embodiment, the gripping protrusions 173 may include one or more stepped portions, each having an apex configured to contact the collar 10 in an assembled configuration to inhibit lateral movement of the collar 10 relative to the housing 100. Alternatively, the gripping protrusions 173 may have a smooth linear or arcuate inner geometry and/or may be supplemented with a coating, material or finish configured to enhance grip.

The second connector 180 may comprise a third flange 181 extending from the second end 112 of the main body portion 110 at a position that is adjacent to the front surface 103 of the housing body 101 and a fourth flange 182 extending from the second end 112 of the main body portion 110 at a position that is adjacent to the rear surface 104 of the housing body 101. The third flange 181 may have an inner surface 183 and an outer surface 184, with the outer surface 184 being generally flush with the front surface 103 of the housing body 101. The fourth flange 182 may have an inner surface 185 and an outer surface 186, with the outer surface 186 being generally flush with the rear surface 104 of the housing body 101. The third and fourth flanges 181, 182 may extend generally perpendicularly from the second end 112 of the main body portion 110 in a spaced apart manner with the inner surfaces 183, 185 facing each other and being spaced apart from each other.

A third arm 187 may extend from the inner surface 183 of the third flange 181 in a direction towards the fourth flange 182. The third arm 187 may extend from the third flange 181 at a terminal end of the third flange 181 which is located furthest from the second end 112 of the main body portion 110. The third arm 187 may terminate in a distal end 188. The third arm 187 may be oriented perpendicularly relative to the third flange 181. A fourth arm 189 may extend from the inner surface 185 of the fourth flange 182 in a direction towards the third flange 181. The fourth arm 189 may extend from the fourth flange 182 at a terminal end of the fourth flange 182 which is located furthest from the second end 112 of the main body portion 110. The fourth arm 189 may terminate in a distal end 190.

The distal ends 188, 190 of the third and fourth arms 187, 189 may be spaced apart from one another by a gap 194. The third arm 187 comprises an inner surface 191 that faces the second end 112 of the main body portion 110 of the housing 100 and the fourth arm 189 comprises an inner surface 192 that faces the second end 112 of the main body portion 110. The inner surfaces 191, 192 of the third and fourth arms 187, 189 may be spaced apart from the second end 112 of the main body portion 110 such that a second nesting region 195 is defined between the third and fourth arms 187, 189 of the second connector 180 and the second end 112 of the main body portion 110 of the housing 100. A portion of a collar may be positioned within the second nesting region 195 when the housing 100 is coupled to the collar. The inner surfaces 191, 192 of the third and fourth arms 187, 189 may comprise gripping protrusions 193 extending inwardly towards the second end 112 of the main body portion 110.

The gripping protrusions 193 may contact the collar to which the housing 100 is attached to prevent the housing 100 from moving substantially along the collar when in use. The gripping protrusions 193 may be formed at or adjacent to the distal ends 188, 190 of the third and fourth arms 187, 189, respectively, and may be formed substantially similar to the gripping protrusions 173.

The first and second arms 167, 169 collectively form a first arm structure which is spaced apart from the first end 111 of the main body portion 110 of the housing 100 by the first nesting region 175. The first nesting region 175 is bounded by the first end 111 of the main body portion 110, the inner surfaces 171, 172 of the first and second arms 167, 169, and the inner surfaces 163, 165 of the first and second flanges 161, 162. The third and fourth arms 187, 189 collectively form a second arm structure which is spaced apart from the second end 112 of the main body portion 110 of the housing 100 by the second nesting region 195. The second nesting region 195 is bounded by the second end 112 of the main body portion 110, the inner surfaces 191, 192 of the third and fourth arms 187, 189, and the inner surfaces 183, 185 of the third and fourth flanges 181, 182.

With reference to FIG. 4D, as mentioned above the housing body 101 defines a cavity 107 that houses the electronic circuit 300 of the sensor apparatus 1000. As mentioned previously, the housing cover 102 may be detachable form the housing body 101 to expose the cavity 107, although this is not required in all embodiments. As best seen in FIG. 4D, the bottom surface 106 of the housing body 101 may be arcuate, and more specifically concave. This may ensure that the bottom surface 106 of the housing body 101 fits naturally around the curvature of the animal's neck when the animal is wearing a collar with the housing 100 attached. The bottom surface 106 of the housing body 101 may be flat/planar in other embodiments, one of which will be described later on in this document.

Figure 5A:
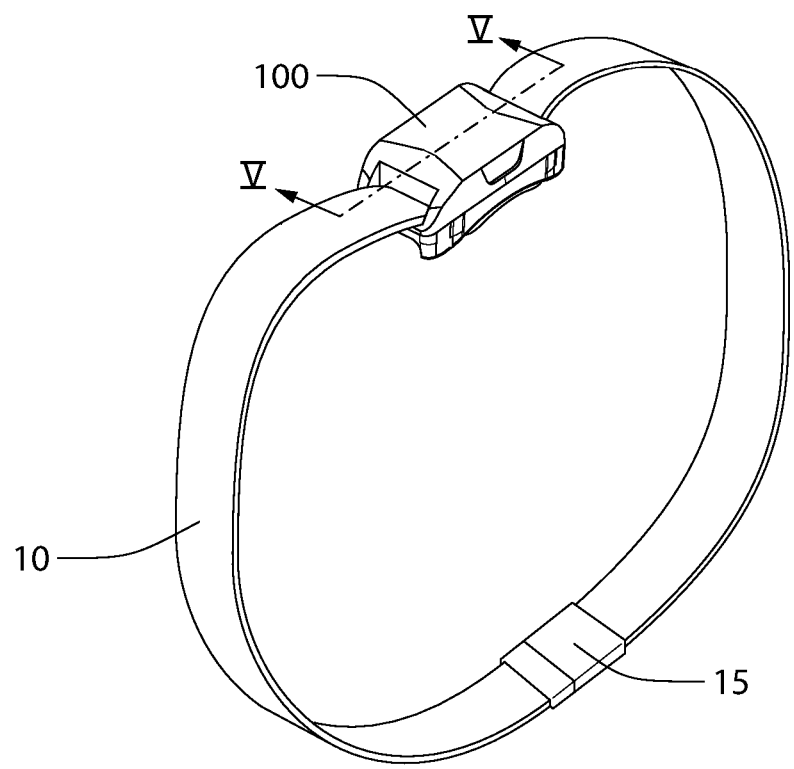
FIG. 5A is a perspective view of the housing of FIGS. 4A-4D coupled to a first type of animal collar.
Figure 5B:
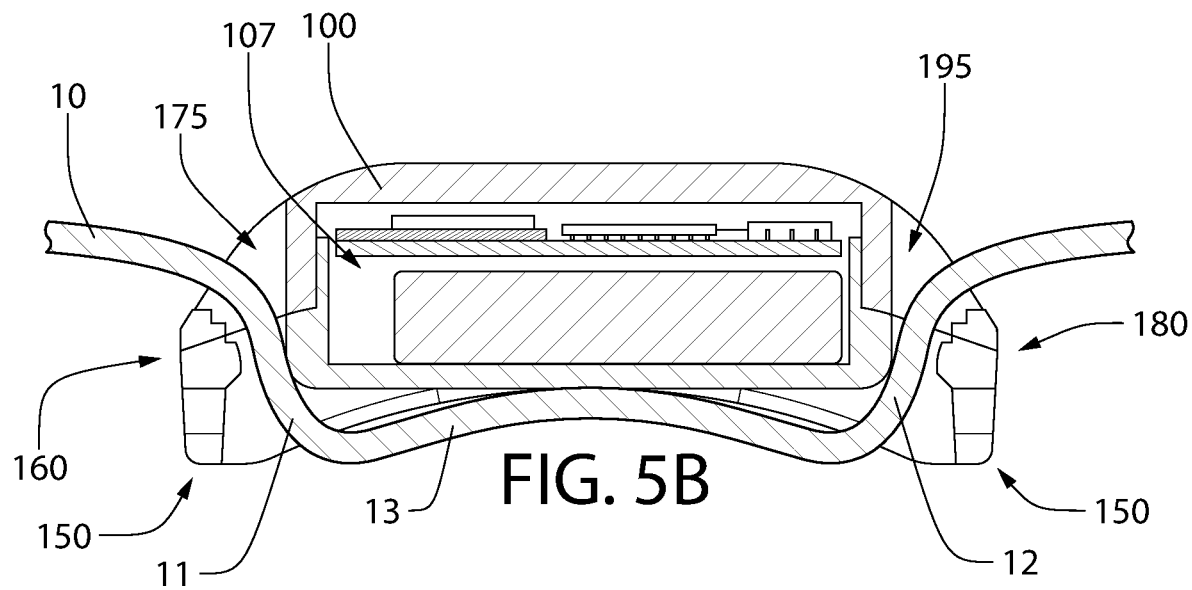
FIG. 5B is a cross-sectional view taken along line V-V of FIG. 5A.

FIGS. 5A and 5B illustrate the housing 100 of the sensor apparatus 1000 coupled to a first type of animal collar 10. More specifically, the sensor assembly which comprises the housing 100 and the electronic circuit 300 is coupled to the first type of animal collar 10. That is, when the first type of animal collar 10 is used, the housing 100 may be coupled thereto without the adaptor assembly 200 being first coupled to the housing 100. In fact, in some embodiments, when the adaptor assembly 200 is coupled to the housing 100, the first type of animal collar 10 may be prevented from being coupled to the housing 100 or the sensor apparatus 1000. As noted previously, the first type of animal collar 10 may be formed from a material selected from the group consisting of nylon, polyester, neoprene, rubber, elastomer, and leather, including combinations of these materials, or these materials which may be coated or covered or combined with other materials. In some embodiments, the first type of animal collar 10 may be formed from a fabric material.

The first type of animal collar 10 may be coupled to the housing 100 by wrapping over and around the arm structures and extending along the bottom of the housing 100. More specifically, a first portion 11 of the first type of animal collar 10 may nest within the first nesting region 175 of the housing 100, a second portion 12 of the first type of animal collar 10 may nest within the second nesting region 195 of the housing 100, and a third portion 13 of the first type of animal collar 10 that extends between the first and second portions 11, 12 of the first type of animal collar 10 may extend along the bottom of the housing 100. Thus, the first type of animal collar 10 may be coupled to the housing 100 via the first connection feature 150 of the housing 100 which comprises the first and second connectors 160, 180 as described in detail above.

The first type of animal collar 10 may comprise a clasp mechanism 15 to facilitate attaching the first type of animal collar 10 onto or detaching the first type of animal collar 10 from the animal. The clasp mechanism 15 may be a conventional buckle with male and female parts that engage one another. The clasp mechanism 15 may alternatively take on other forms, including being a breakaway mechanism that automatically separates upon application of a force to prevent choking. The exact structure and type of the clasp mechanism 15 is not to be limiting of the invention in all embodiments. When the clasp mechanism 15 is in an attached state as shown in FIG. 5A, the collar 10 forms a loop structure that is configured to be positioned around an animal's neck. Furthermore, the housing 100 is supported on the first type of animal collar 10 to perform its functions as described below.

Thus, the housing 100 may be a one-piece, monolithic structure which can be used by itself (i.e., without the adaptor assembly 200) when the sensor apparatus 1000 is being coupled to the first type of animal collar 10. The first connection feature 160 is integral with the housing 100 and therefore the housing 100 includes all features required to attach the sensor apparatus 1000 to the first type of animal collar 10.

Figure 6A:
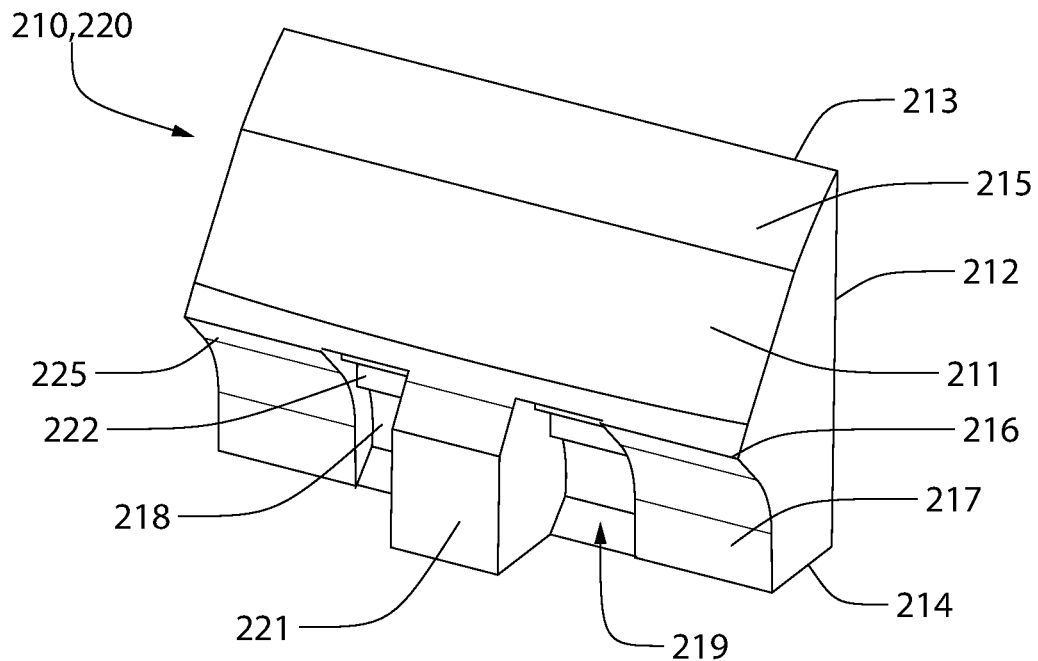
FIG. 6A is a front perspective view of a plug of an adaptor assembly of the sensor apparatus of FIG. 1.
Figure 6B:
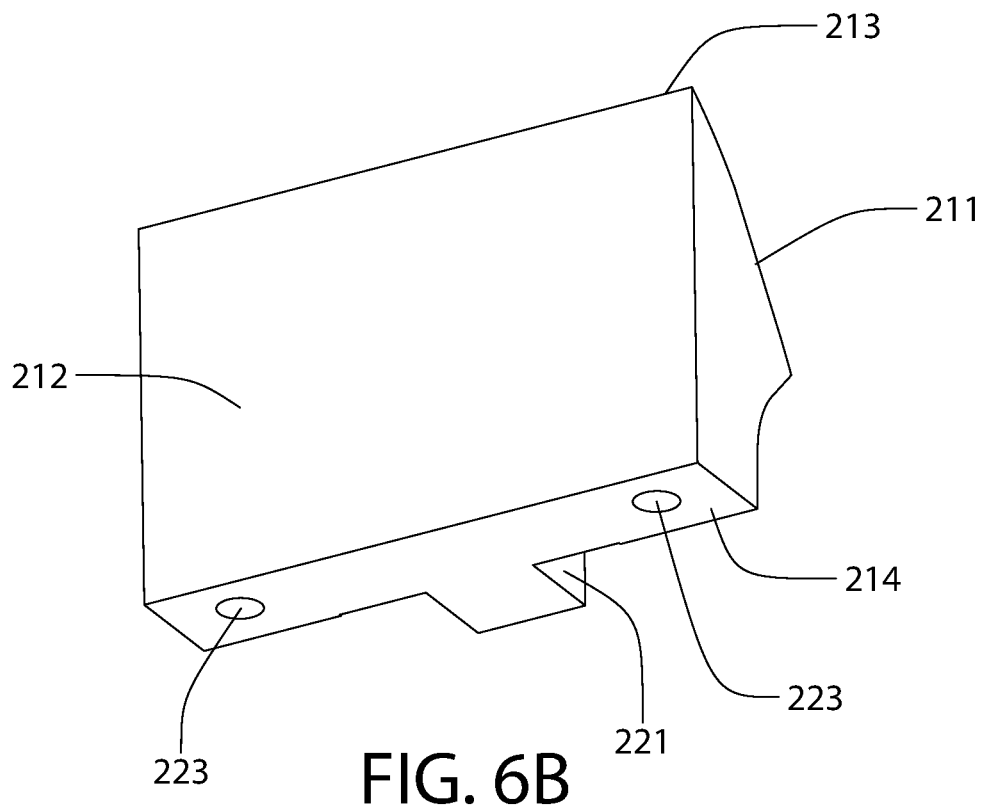
FIG. 6B is a rear perspective view of the plug of FIG. 6A.

In order to render the sensor apparatus 1000 capable of being coupled to a second type of animal collar as described further herein below, the adaptor assembly 200 (or at a minimum, the bracket member 230 of the adaptor assembly 200) may need to first be coupled to the housing 100. FIGS. 6A and 6B are front and rear perspective views of the first and second plugs 210, 220 of the adaptor assembly 200. The first and second plugs 210, 220 are identical, and thus while the description below references only the first plug 210, it is applicable to both of the first and second plugs 210, 220. The first plug 210 may be configured to be positioned within the first nesting region 175 of the housing 100 and the second plug 220 may be configured to be positioned within the second nesting region 195 of the housing 100, as described in greater detail below.

The first plug 210 comprises a front 211, a rear 212, a top 213 and a bottom 214. The rear 212 may be flat to enable it to rest in abutting contact with the first end wall 111 of the main body portion 110 of the housing 100 when coupled thereto. The front 211 may have various contours necessary to enable the first plug 210 to engage with the first and second arms 171, 172 of the first connector 160 when the first plug 210 nests within the first nesting region 175. The front 211 may have a top portion 215 that extends from the top 213 to a transition region 216 and a bottom portion 217 that extends from the transition region 216 to the bottom 214. The top portion 215 may be planar in some embodiments, although it is arcuate, and more specifically convex in the exemplified embodiment in order to match the contour of the portions of the housing 100 that are adjacent to the first plug 210 when the first plug 210 is positioned within the first nesting region 175. The bottom portion 217 may be arcuate, and more specifically concave, along at least a portion thereof. An upper region of the bottom portion 217 may form a downwardly facing shoulder 225 which may engage or contact the arm structure of the housing 100 to retain the first plug 210 in place when assembled/coupled to the housing 100.

A central region 218 of the bottom portion 217 may comprise a recess 219. Within the recess 219, there may be ribs 222 that are configured to mate with the gripping protrusions 173 of the housing 100 described above. Furthermore, there may be a protrusion 221 protruding from the recess 219. The protrusion 221 may protrude beyond the outer surface of the bottom portion 217 of the front 211. The protrusion 221 may be located centrally along the recess 219 such that there are two portions of the recess 219 located on opposing sides of the protrusion 221. Thus, when the first plug 210 is positioned within the first nesting region, the protrusion 221 extends into the gap 174 between the first and second arms 167, 169 of the first connector 160 and the gripping protrusions 173 on the inner surfaces of the first and second arms 167, 169 are aligned with the two portions of the recess 219. The first plug 210 may be specifically sized and shaped to fit snugly within the first nesting region 175. The second plug 220 may be specifically sized and shaped to fit snugly within the second nesting region 195.

The bottom 214 of the first plug 210 may comprise two apertures 223. While two apertures 223 are shown in the exemplified embodiment, there may be one aperture or more than two apertures in other embodiments. The apertures 223 may be configured to receive the screws 201 mentioned above with reference to FIG. 2 to facilitate coupling of the bracket 230 thereto.

Figure 7A:
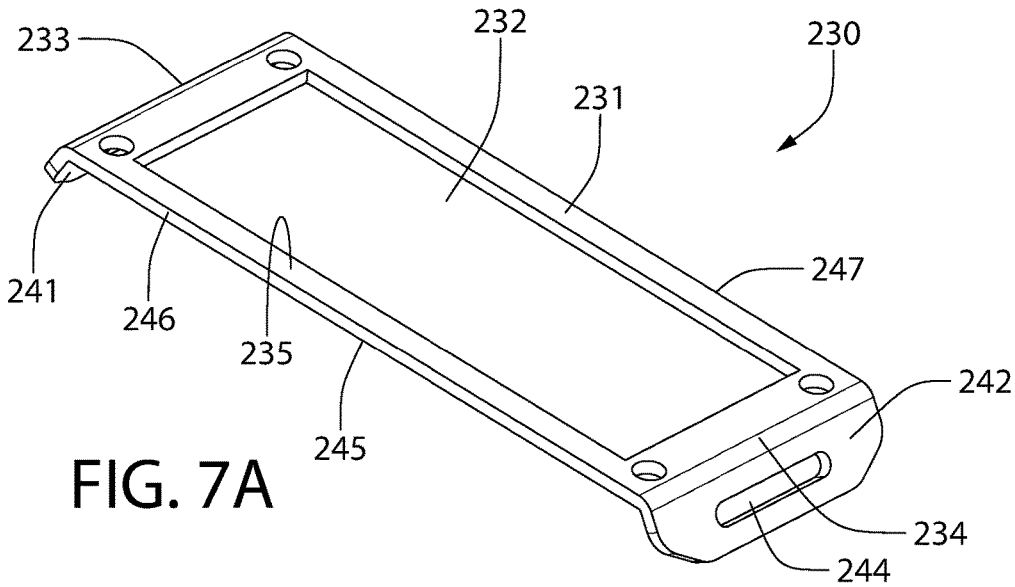
FIG. 7A is a top perspective view of a bracket of the adaptor assembly of the sensor apparatus of FIG. 1.
Figure 7B:
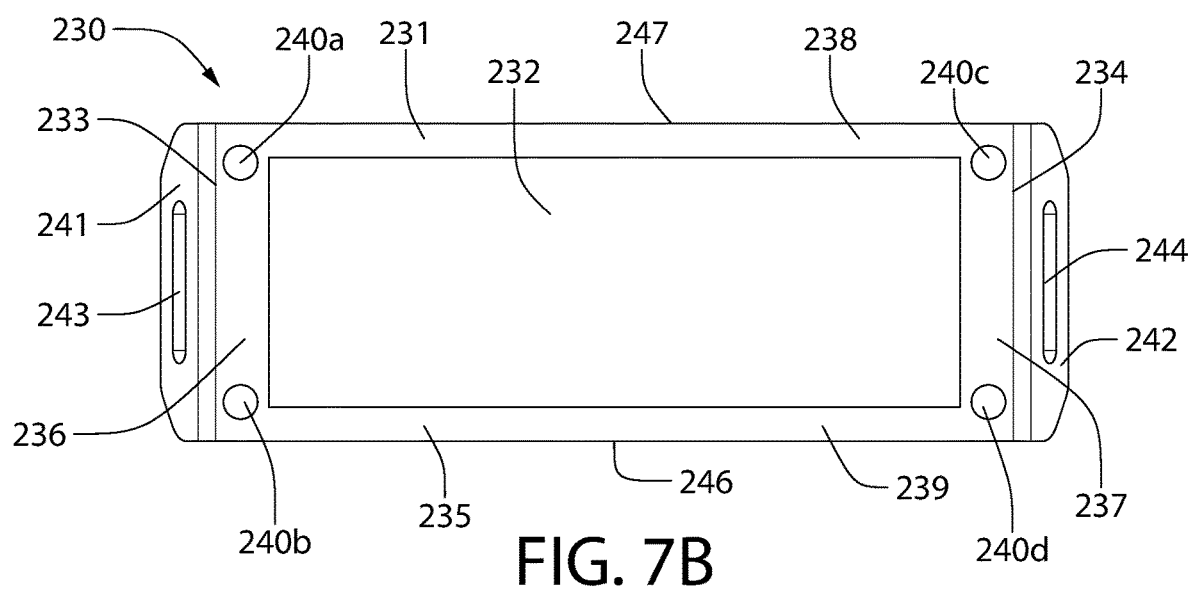
FIG. 7B is a top plan view of the bracket of FIG. 7A.
Figure 7C:
FIG. 7C is a front view of the bracket of FIG. 7A.

Referring to FIGS. 7A-7C, the bracket 230 will be described. The bracket 230 comprises a plate member 231. The plate member 231 may have a rectangular shape as shown, although it may take on other shapes in other embodiments, including square, triangular, or other polygonal shapes. The plate member 231 may define or form a frame which surrounds a central opening 232. The plate member 231 comprises a first side edge 233 and a second side edge 234. The plate member 231 may be elongated in a direction between the first and second side edges 233, 234. The plate member 231 may have a planar top surface 235 and a planar bottom surface 245.

The plate member 231 may comprise a first linear section 236 which comprises the first side edge 233 and a second linear section 237 which comprises the second side edge 234. The plate member 231 may further comprise a third linear section 238 and a fourth linear section 239 each extending between the first and second linear sections 236, 237. The plate member 231 may comprise a plurality of apertures 240a-d including a first aperture 240a located along the first linear section 236 adjacent to the third linear section 238, a second aperture 240b located along the first linear section 236 adjacent to the fourth linear section 239, a third aperture 240c located along the second linear section 237 adjacent to the third linear section 238, and a fourth aperture 240d located along the second linear section 237 adjacent to the fourth linear section 239. Each of the apertures 240a-d may be aligned with the one of the apertures 223 in one of the first and second plugs 210, 220 when the adaptor assembly 200 is assembled onto the housing 100 so that a fastener (e.g., a screw) can be inserted through each aligned pair of one of the apertures 240a-d and one of the apertures 223.

The adaptor assembly 200, and more specifically the bracket 230 thereof, may comprise a second connection feature that is configured for coupling the sensor apparatus 1000 to a second type of animal collar as described further below. The bracket 230 may comprise a first connector portion 241 extending obliquely from the first side edge 233 of the plate member 231 and a second connector portion 242 extending obliquely from the second side edge 234 of the plate member 231. Each of the first and second connector portions 241, 242 may extend in a direction away from the bottom surface 245 of the plate member 231 so that an inner surface of the connector portions 241, 242 forms an oblique angle which is greater than 90° with the bottom surface 245 of the plate member 231. In alternative embodiments, the first and second connector portions 241, 242 may extend perpendicularly from the plate member 231, although the oblique embodiment may have a more conformal fit with the contours of the animal's neck.

The first connector portion 241 may comprise a first elongated aperture 243. The second connector portion 242 may comprise a second elongated aperture 244. The elongated apertures 243, 244 may be elongated in a direction between a front edge 246 and a rear edge 247 of the bracket 230. The first and second connector portions 241, 242, and more specifically the first and second elongated apertures 243, 244 thereof, may form the second connection feature of the adaptor assembly 200.

Figure 8A:
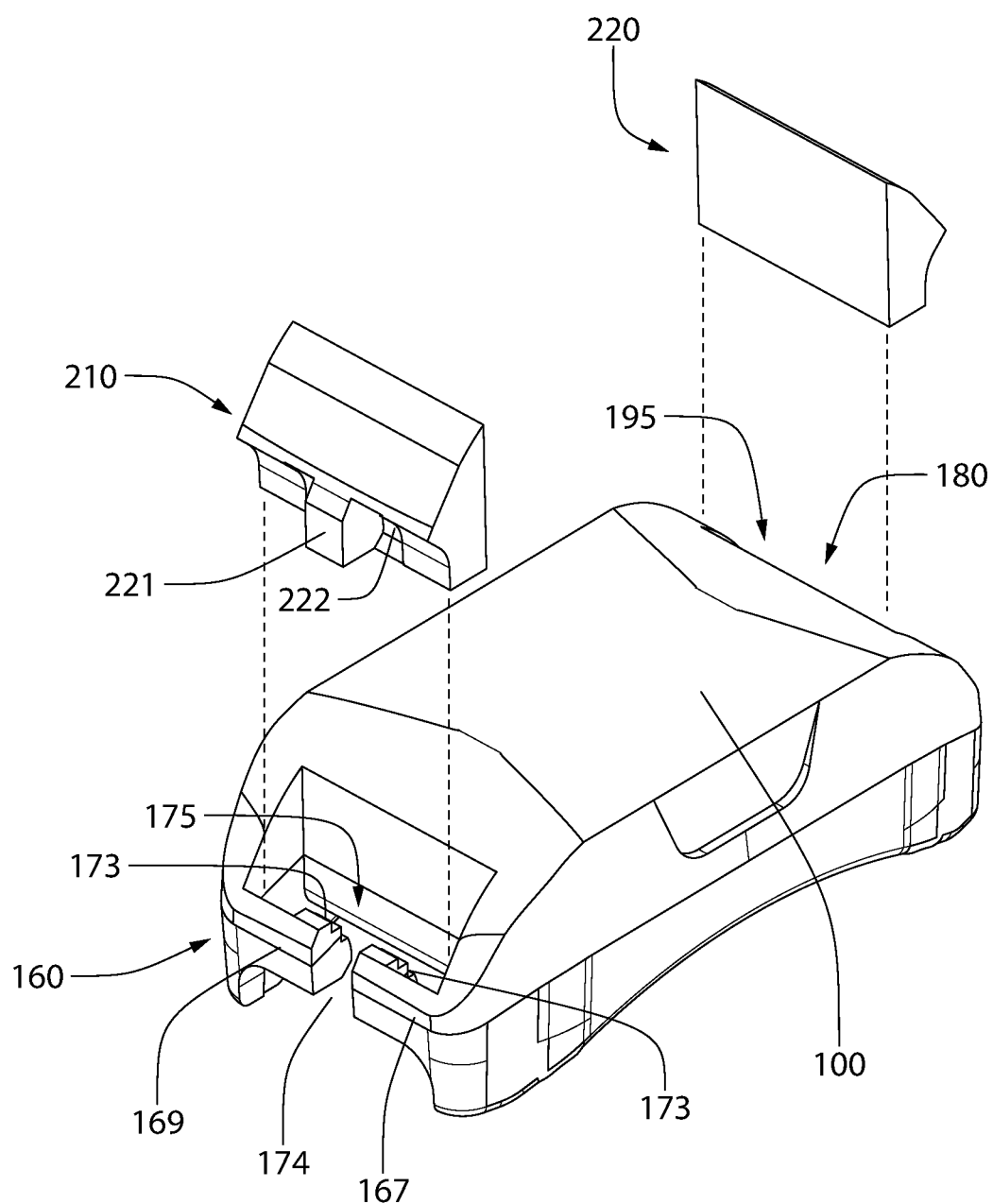
FIG. 8A is an illustration of the housing and the plugs of the sensor apparatus of FIG. 1 with a dashed line indicating the manner of assembly thereof.
Figure 8B:
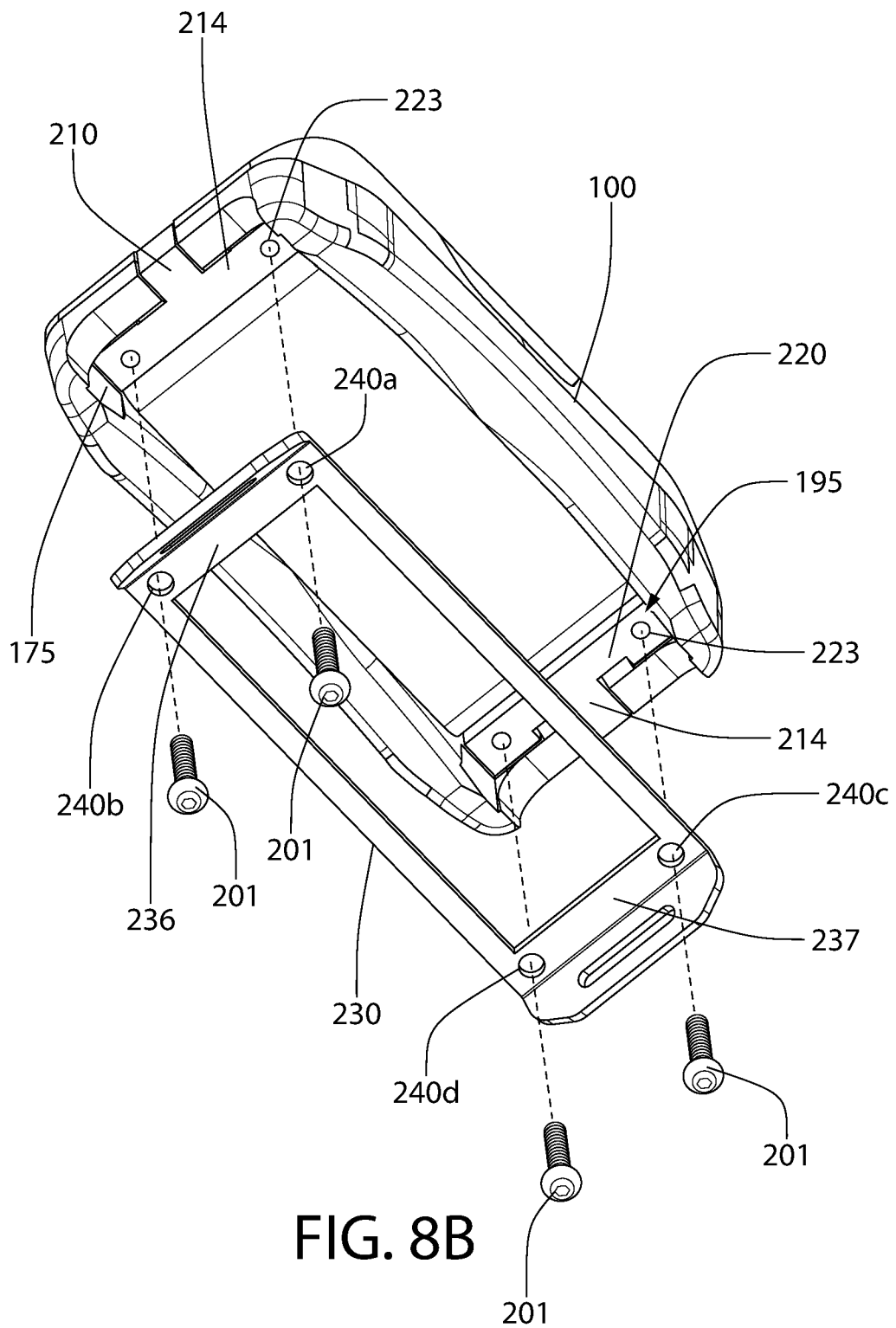
FIG. 8B is an illustration of the housing with the plugs attached per FIG. 8A, and further illustrating the bracket of the adaptor assembly being coupled thereto.
Figure 8C:
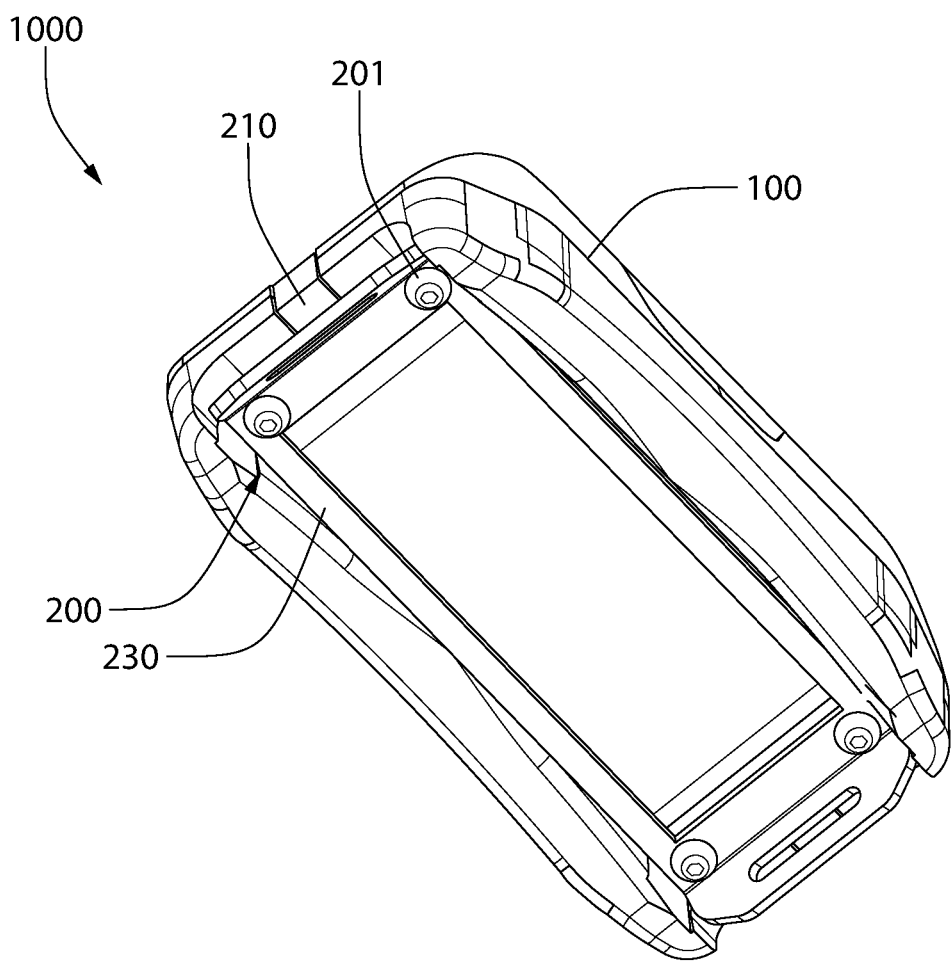
FIG. 8C is a bottom perspective view of the sensor apparatus of FIG. 1.

Referring to FIGS. 8A-8C in succession, the attachment or coupling of the adaptor assembly 200 to the housing 100 will be described. It should be appreciated that in some embodiments the sensor apparatus 1000 may be a kit which comprises the housing 100 and the adaptor assembly 200. It may be up to the user or consumer to decide whether to attach the adaptor assembly 200 to the housing 100 or not, depending on whether the first or second type of collar is intended to be used with the sensor apparatus 1000. The sensor apparatus 1000 may comprise the housing 100 with the electronic circuit 300 contained therein, or the sensor apparatus 1000 may comprise the housing 100 with the electronic circuit 300 contained therein and with the adaptor assembly 200 coupled thereto. These are both different forms of the sensor apparatus 1000 to be used in accordance with the type of collar to which the sensor apparatus 1000 is to be attached.

The adaptor assembly 200 may be sold together with the housing 100 and electronic circuit 300. Alternatively, the housing 100 and the electronic circuit 300 may be sold together, and the adaptor assembly 200 may be an auxiliary part that is sold separately from the housing 100 and the electronic circuit 300 when desired to use the sensor apparatus 1000 with a second type of animal collar.

With reference to FIG. 8A, the first step in the coupling of the adaptor assembly 200 to the housing 100 may comprise inserting the first plug 210 into the first nesting region 175 of the housing 100 and inserting the second plug 220 into the second nesting region 195 of the housing 100. This may comprise translating or moving the first and second plugs 210, 220 downwardly into the first and second nesting regions 175, 195, respectively. In doing this, the body portion of the first plug 210 is positioned within the first nesting region 175 and the protrusion 221 of the first plug 210 is positioned within the gap 174 between the first and second arms 167, 169. Furthermore, the ribs 222 of the first plug 210 mate with the gripping protrusions 173 on the inner surfaces of the first and second arms 167, 169. FIG. 1 illustrates the second plug 220 nesting with the second nesting region 195 and also shows the position of the protrusion of the second plug 220 within the gap 194 between the arms 187, 189. The same structural arrangement is achieved with the first plug 210 in the first nesting region 175. As noted herein, in some embodiments the first and second plugs 210, 220 may not be used and instead the mounting bracket 230 may be mounted directly to the housing 100.

The first and second plugs 210, 220 may maintain a flush exterior of the device. Furthermore, as seen in FIG. 1, the first and second plugs 210, 220 may completely block the first and second nesting regions 175, 195, thereby preventing the first type of collar 10 from utilizing this space for attachment to the sensor apparatus 1000. Thus, in this embodiment, the first connection feature 150 (which comprises the first and second nesting regions 175, 195) is inaccessible for coupling the sensor apparatus 1000 to the first type of animal collar 10 when the plugs 210, 220 are coupled to the housing 100. When the first and second plugs 210, 220 are coupled to the housing 100, the downward facing shoulder 225 of the first plug 210 engages or contacts an upper edge of the first and second arms 167, 169 (or the third and fourth arms 187, 189 for the second plug 220). This engagement forms a stop feature which prevents the first plug 210 from passing fully through the first nesting region 175 (and prevents the second plug 220 from passing fully through the second nesting region 195). That is, the abutting contact between the downward facing shoulder 225 of the first plug 210 and the first and second arms 167, 169 prevents the first plug 210 from moving/translating any further. The first plug 210 can only be removed from the first nesting region 175 by moving/translating the first plug 210 upwardly back from where it came.

FIG. 8B illustrates the housing 100 with the first and second plugs 210, 220 positioned within the first and second nesting regions 175, 195 as previously described. When so positioned, the bottom surface 214 of the first and second plugs 210, 220 are exposed. As such, the apertures 223 in the bottom 214 of the first and second plugs 210, 220 are also exposed and accessible. Next, the bracket 230 is positioned adjacent to the bottom of the housing 100 and moved towards the housing 100 until the first and second linear sections 236, 237 of the bracket 230 abut against the bottom 214 of the first and second plugs 210, 220, respectively. Once the bracket 230 is so positioned, the apertures 240*a-d* in the bracket 230 are aligned with the apertures 223 in the plugs 210, 220. Next, the fasteners 201 (e.g., screws) may be inserted through the aligned apertures 240*a-d*, 223 to couple the bracket 230 to the first and second plugs 210, 220.

As discussed herein, the first and second plugs 210, 220 may be omitted in some embodiments and the bracket 230 may be coupled directly to the housing 100. In other embodiments, the first and second plugs 210, 220 may be included and attached to the housing 100 as described herein, and the bracket 230 may be coupled to the housing 100 instead of to the first and second plugs 210, 220. For example, the housing 100 may have screw apertures or negative space formed therein for receiving the screws 201 to mount or couple the bracket 230 to the housing 100. The location of the holes 240*a-d* along the bracket 230 may be altered from that shown to ensure alignment between the holes 240*a-d* and any screw apertures formed into the housing 100. In an embodiment whereby the bracket 230 is coupled directly to the housing 100, the first and second plugs 210, 220 may be retained in place via friction or tight fit against the housing 100, adhesive, mechanically engaging features, indent/detent type engagement, or the like.

At this point, the adaptor assembly 200 is coupled to the housing 100 and cannot be separated from the housing 100 without first removing the fasteners 201. This is shown in FIG. 8C. As previously mentioned, the first and second plugs 210, 220 are prevented from moving further downwardly due to the abutting contact between the downwardly facing shoulder 225 of the first and second plugs 210, 220 and the arm structures of the first and second connectors 160, 180. Furthermore, the bracket 230 prevents the attachment structure 200 from moving in the opposite direction (i.e., towards the top 105 of the housing 100) due to its abutment against the bottom of the housing 100.

Figure 9:
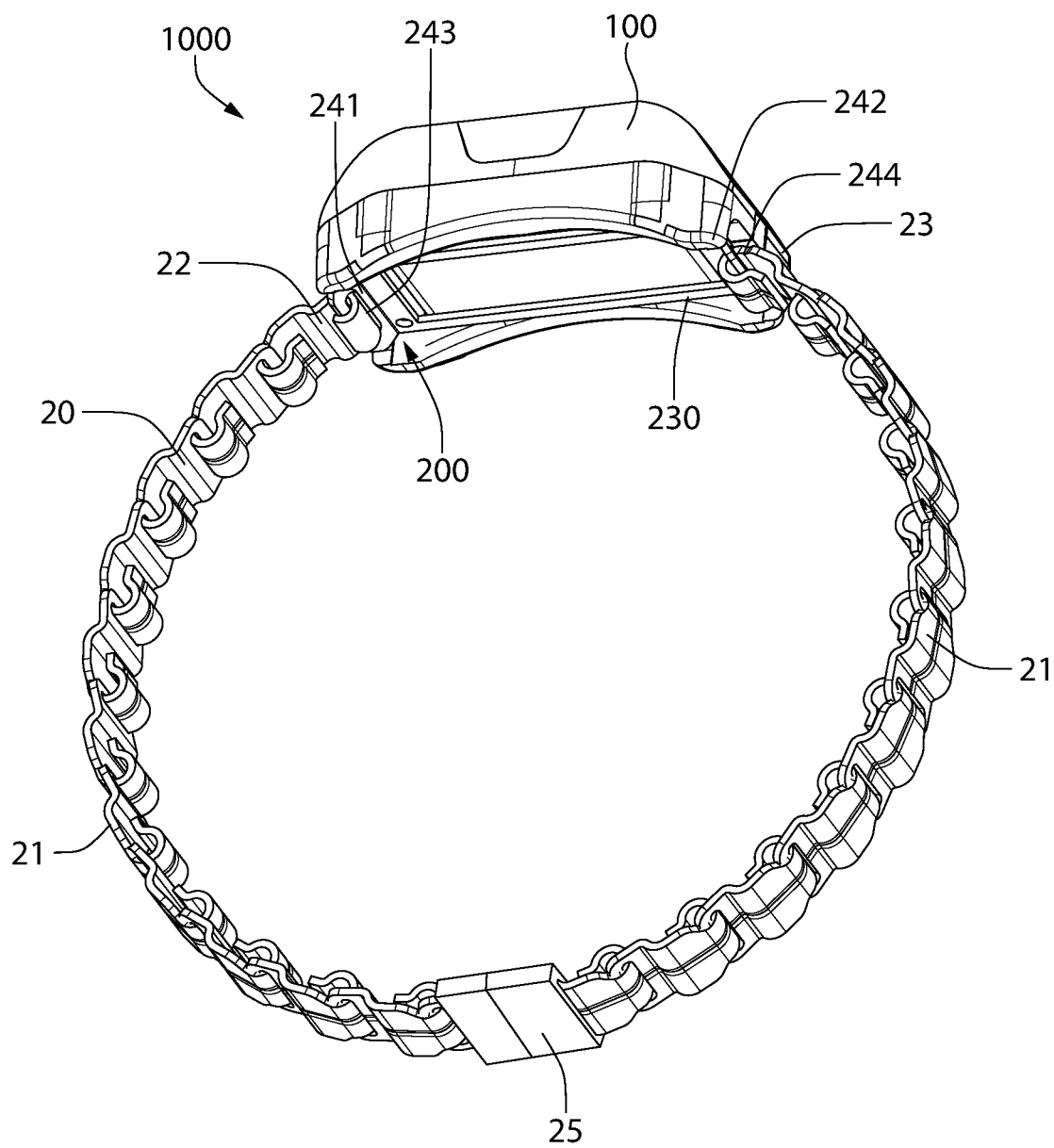
FIG. 9 is a perspective view of the sensor of FIG. 1 coupled to a second type of animal collar.

FIG. 9 illustrates a second type of animal collar 20 coupled to the sensor apparatus 1000 when the sensor apparatus 1000 includes the adaptor assembly 200 coupled to the housing 100. The second type of animal collar 20 may differ from the first type of animal collar 10 in at least one characteristic. The at least one characteristic may be material. The second type of animal collar 20 may be formed from metal and the first type of animal collar 10 may not be formed from metal. The second type of animal collar 20 may be chew resistant, due to its being formed from metal, for example. The second type of animal collar 20 may comprise a plurality of metal linkages 21 that are attached together. Each of the linkages 21 may include a hook portion and an apertured portion, such that the hook portion of one linkage 21 may be inserted into the apertured portion of an adjacent linkage 21.

The second type of animal collar 20 may have a first end linkage 22 and a second end linkage 23. The hook portion of the first end linkage 22 may be inserted into the first elongated aperture 243 of the first connector portion 241 of the adaptor assembly 200. The hook portion of the second end linkage 23 may be inserted into the second elongated aperture 244 of the second connector portion 242 of the adaptor assembly 200. The first and second end linkages 22, 23 may be detachable from the adaptor assembly 200 by pivoting to remove the hook portions thereof from the first and second elongated apertures 243, 244. The second type of animal collar 20 may further include a clasp mechanism 25, which may be a breakaway mechanism to prevent choking, a buckle-style mechanism, a clasp, or any other type of mechanism which allows a person to attach and detach the second type of animal collar 20 from around an animal's neck.

Figure 10:
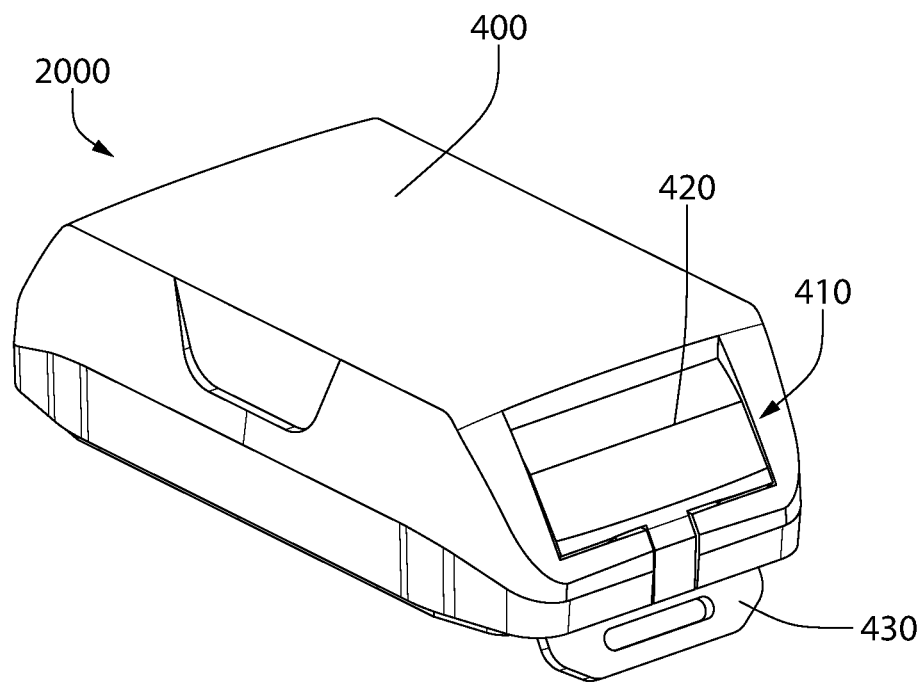
FIG. 10 is a perspective view of a sensor apparatus in accordance with another embodiment of the present invention.
Figure 11:
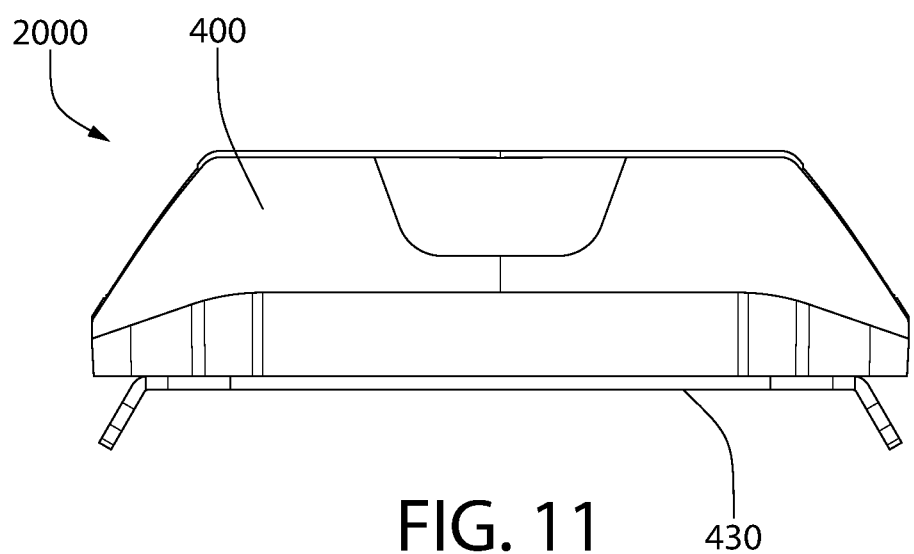
FIG. 11 is a front view of the sensor apparatus of FIG. 10.

FIGS. 10 and 11 illustrate an alternative embodiment of a sensor apparatus 2000 in accordance with the invention disclosed herein. The sensor apparatus 2000 comprises a housing 400 and an adaptor assembly 410 with the adaptor assembly 410 comprising first and second plugs 420 (only one is visible, but the description of the first and second plugs 210, 220 of the prior embodiment is applicable) and a bracket 430. The sensor apparatus 2000 is identical to the sensor apparatus except that the bottom surface of the housing 400 is flat rather than arcuate/concave. Other than this, the description of the sensor apparatus 1000 is entirely applicable to the sensor apparatus 2000.

Figure 12:
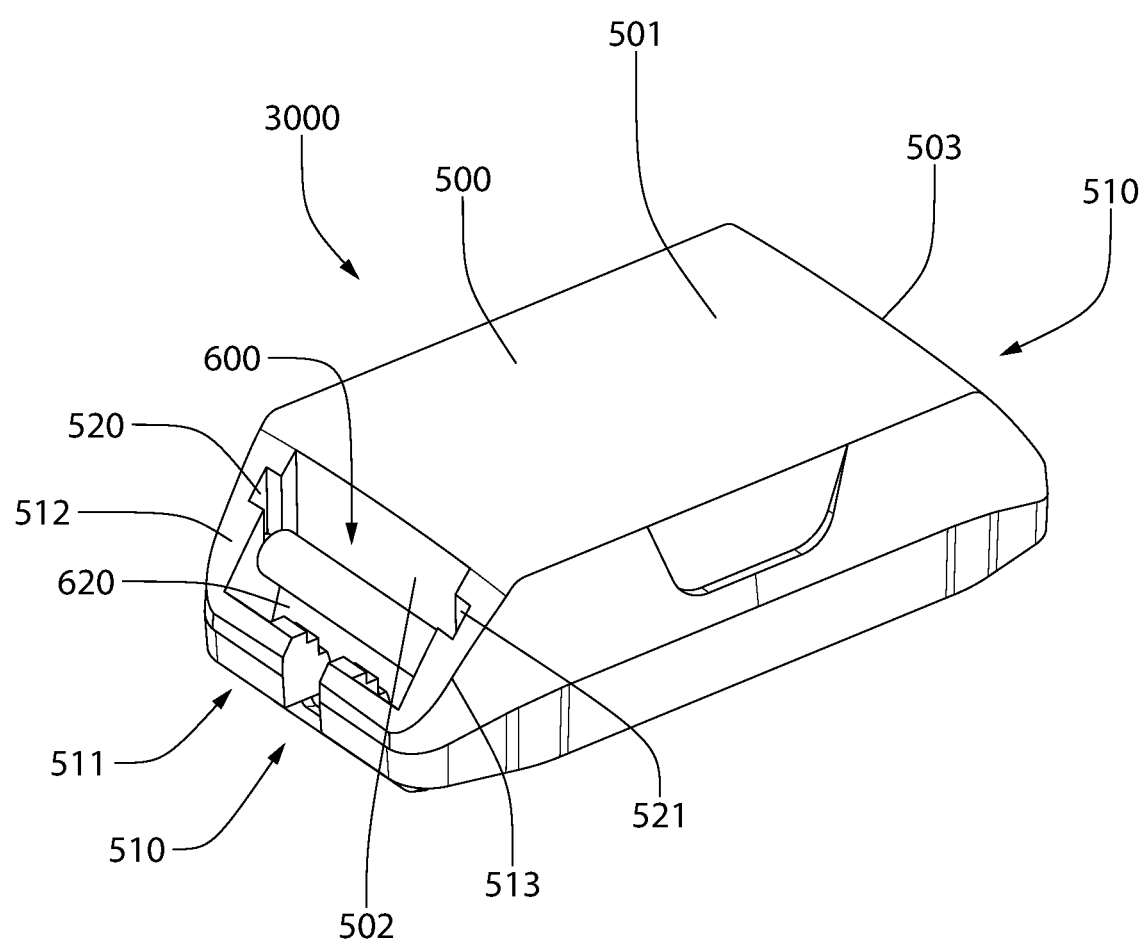
FIG. 12 is a perspective view of a sensor apparatus in accordance with yet another embodiment of the present invention.
Figure 13:
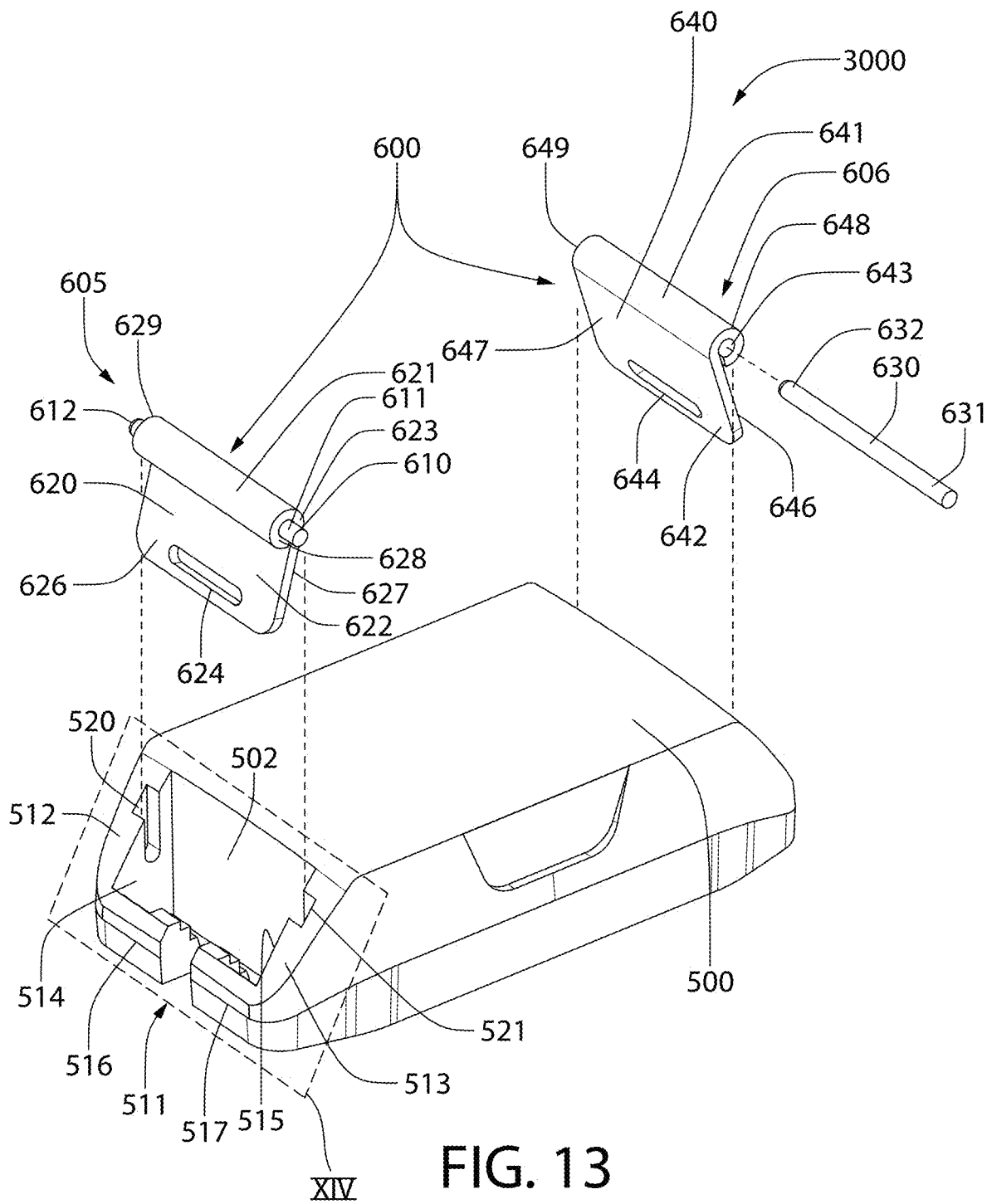
FIG. 13 is an exploded perspective view of the sensor apparatus of FIG. 12, illustrating a housing and an adaptor assembly thereof.
Figure 14:
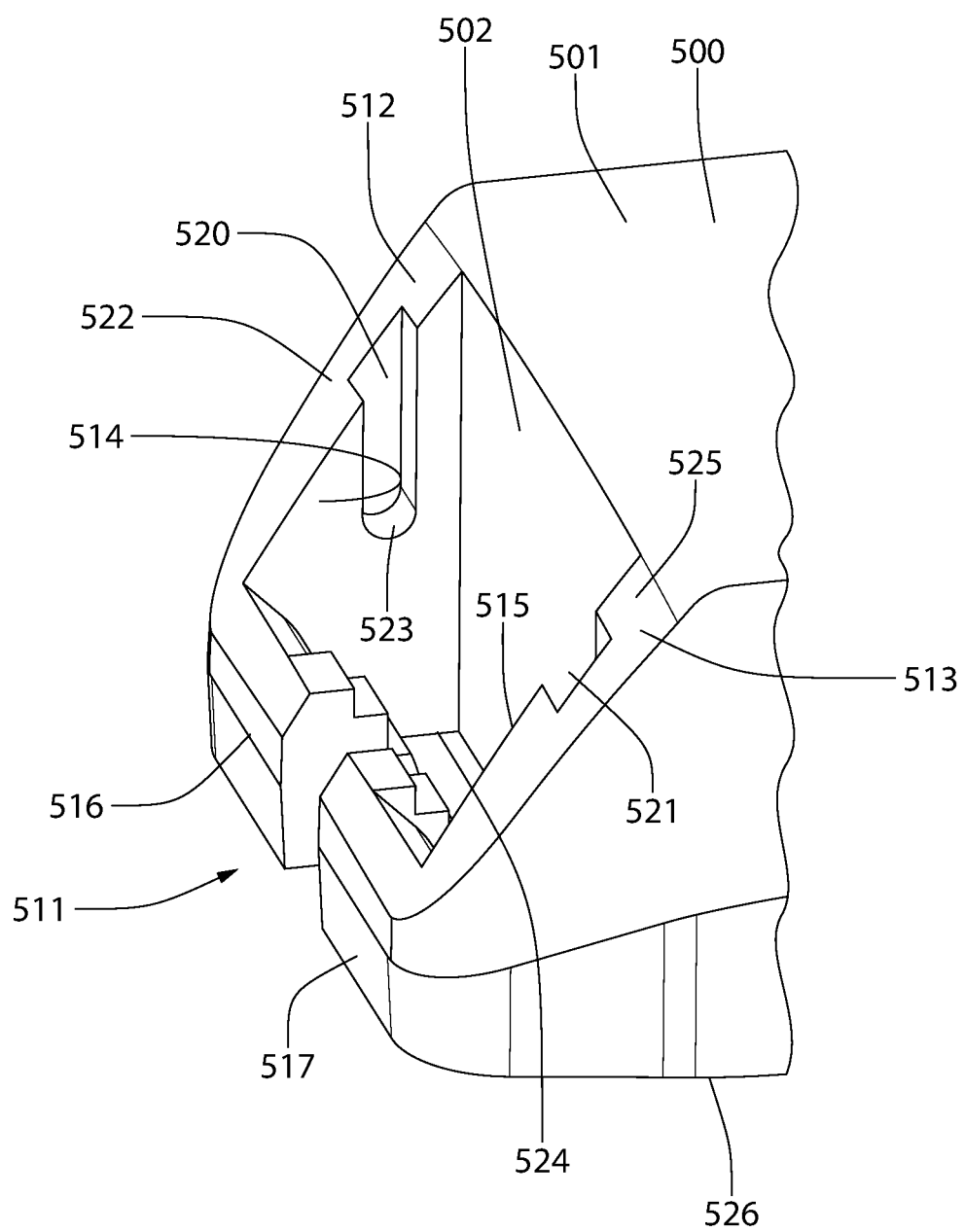
FIG. 14 is a close-up view of area XIV of FIG. 13.

FIGS. 12-14 illustrate yet another embodiment of a sensor apparatus 3000 in accordance with the invention disclosed herein. The sensor apparatus 3000 comprises a housing 500 and an adaptor assembly 600. The housing 500 is identical to the housing 100 previously described except for the addition of slots in the inner surfaces of the flanges of the connection feature thereof, described further below. Other than the slots, the housing 500 is completely identical to the housing 100 and thus the description of the housing 100 is applicable. Furthermore, the sensor apparatus 3000 (and all other sensor apparatuses described herein) includes an electronic circuit which is identical to the electronic circuit 300 although it is not depicted or described specifically with regard to this embodiment. It should be understood that each sensor apparatus described herein includes an electronic circuit and the description of the electronic circuit 300 is therefore applicable to each embodiment described herein.

As with the previous embodiment, the housing 500 comprises a main body portion 501 having a first end 502 and a second end 503 and a first connection feature 510. The first connection feature 510 comprises a first connector 511 located at the first end 502 of the main body portion 501 and a second connector (not visible) located at the second end 503 of the main body portion 501. The second connector is not shown in the drawings, but is identical to the first connector 511 and thus the description of the first connector 511 is applicable to the second connector.

The first connector 511 comprises a first flange 512 and a second flange 513 extending from the first end 502 of the main body portion 501 of the housing 500 in a direction generally perpendicular to the first end 502. The first flange 512 may be adjacent to a front of the housing 500 and the second flange 513 may be adjacent to the rear of the housing 500. The first flange 512 may have an inner surface 514 and the second flange 513 may have an inner surface 515. The inner surfaces 514, 515 may face each other. The first connector 511 may further comprise a first arm 516 extending from a terminal end of the first flange 512 in a direction towards the second flange 513 and a second arm 517 extending from a terminal end of the second flange 513 in a direction towards the first flange 512. The structure of the first and second flanges 512, 513 and the first and second arms 516, 517 is identical to the structure of the same parts noted above with reference to the sensor apparatus 1000 and thus any additional description of those parts provided above is applicable to this embodiment as well.

The difference between this embodiment and the one previously described is as follows. A first slot 520 is formed into the inner surface 514 of the first flange 512 and a second slot 521 is formed into the inner surface 515 of the second flange 513. The first and second slots 520, 521 may be elongated in a vertical direction. The first slot 520 may extend from a top edge 522 of the first flange 512 to a floor 523 that is spaced above the bottom edge 524 of the first flange 512. The second slot 521 may extend from a top edge 525 of the second flange 513 to a floor (not visible, but the same as the floor 523) that is spaced above the bottom edge 526 of the second flange 513. Thus, the first and second slots 520, 521 may be open at the top edges 522, 525 of the first and second flanges 512, 513. The main body 501 of the housing 500 also has a second connector at the second end 503 which has an identical structure including the flanges, the arms, and the slots as described.

The adaptor assembly 600 comprises two identical attachment structures 605, 606, one for attachment to the first connector 511 on the first side of the main body 501 and one for attachment to the second connector (not visible) on the second side of the main body 501. Thus, the adaptor assembly 600 comprises a first pin 610, a first plate member 620 configured to be coupled to the first pin 610, a second pin 630, and a second plate member 640 configured to be coupled to the second pin. The first pin 610 and the first plate member 620 form the first attachment structure 605 and the second pin 630 and the second plate member 640 form the second attachment structure 606.

The first and second pins 610, 630 are elongated cylindrical shaped structures which may be formed from metal, or alternatively plastic or other rigid materials. The first plate member 620 comprises a loop portion 621 and a plate portion 622 extending from the loop portion 621. The first plate member 620 comprises a front surface 626, a rear surface 627, a first side edge 628, and a second side edge 629. The loop portion 621 defines an elongated through-hole 623 that extends from the first side edge 628 to the second side edge 629. The first pin 610 is positioned within the elongated through-hole 623 when the first pin 610 is coupled to the first plate member 620. A first end portion 611 of the first pin 610 protrudes from the first side edge 628 and a second end portion 612 of the first pin 610 protrudes from the second side edge 629 when the pin 610 is positioned within the through-hole 623. The plate portion 622 comprises an aperture 624 that extends from the front surface 626 to the rear surface 627. The aperture 624 may be in the shape of an elongated oval. The first plate member 620 may be an integral structure formed from sheet metal which is bent into the shape as shown in the drawings.

The second plate member 640 comprises a loop portion 641 and a plate portion 642 extending from the loop portion 641. The first plate member 640 comprises a front surface 646, a rear surface 647, a first side edge 648, and a second side edge 649. The loop portion 641 defines an elongated through-hole 643 that extends from the first side edge 648 to the second side edge 649. The second pin 630 is positioned within the elongated through-hole 643 when the second pin 630 is coupled to the second plate member 640. A first end portion 631 of the second pin 630 protrudes from the first side edge 648 and a second end portion 632 of the second pin 630 protrudes from the second side edge 649 when the pin 630 is positioned within the through-hole 643. The plate portion 642 comprises an aperture 644 that extends from the front surface 646 to the rear surface 647. The aperture 644 may be in the shape of an elongated oval. The second plate member 640 may be an integral structure formed from sheet metal which is bent into the shape as shown in the drawings.

The adaptor assembly 600 is coupled to the housing 500 as follows. First, each attachment structure 605, 606 is assembled by inserting the first and second pins 610, 630 through the through-holes of the respective first and second plate members 620, 640. The first and second pins 610, 630 have lengths that are greater than the lengths of the through-holes 623, 643 so that first and second end portions 611, 612, 631, 632 of the first and second pins 610, 630 protrude from the first and second ends of the first and second plate members 620, 640. The first and second end portions 611, 612, 631, 632 are then inserted into the slots previously described. In particular, with reference to the first connector 511 only because the second connector is not visible in the drawings, the first end portion 611 of the first pin 610 is inserted into the slot 521 and simultaneously the second end portion 612 of the first pin 610 is inserted into the slot 520. The first pin 610 is then moved downwardly within the slots 520, 521 until the first and second end portions 611, 612 abut against the floors 523 of the slots 520, 521. The pins 610, 620 may lock in place once so positioned. This may be achieved with a spring feature on the pins 610, 630, with the slots 520, 521 having a recess located adjacent to the floor 523 thereof, or with the slots being extended to have an angled portion at the bottom of the slot (the angled portion may extend at an angle relative to the remainder of the slot to prevent the pin from falling out). Other techniques for achieving this locking engagement are also contemplated.

When so assembled, the first and second plate members 620, 640 are pivotable relative to the first and second pins 610, 630 to which they are coupled. The first plate member 620 hangs from the first pin 610 and is located within the first nesting region. Thus, the first plate member 620 is positioned within the first nesting region of the housing and is capable of pivoting therein. The second plate member 640 hangs from the second pin 630 and is located within the second nesting region. Thus, the second plate member 640 is positioned within the second nesting region of the housing and is capable of pivoting therein.

Figure 15:
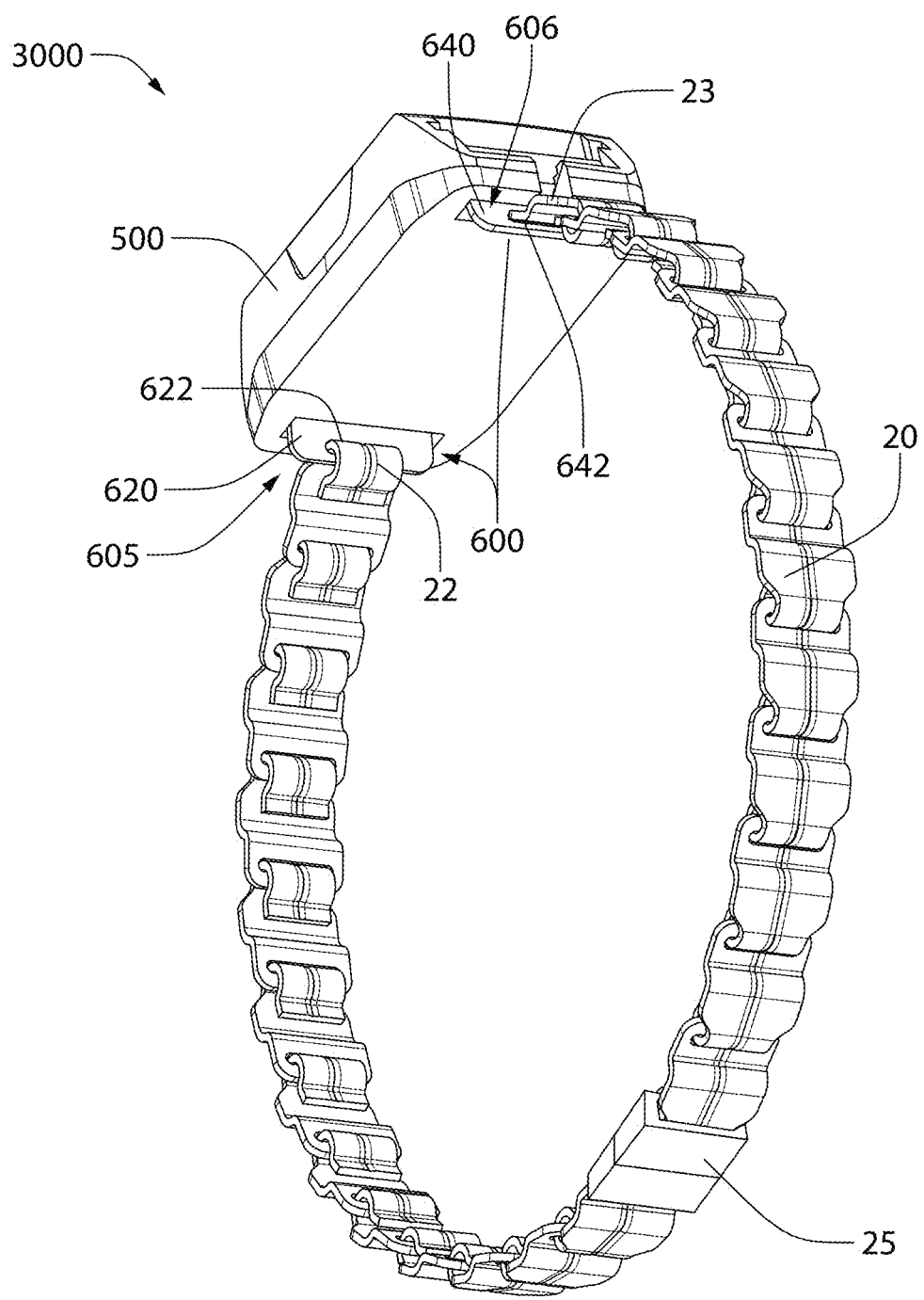
FIG. 15 is a perspective view of the sensor apparatus of FIG. 11 coupled to the second type of animal collar.

Referring to FIG. 15, the sensor apparatus 3000 may be coupled to the second type of collar 20 in a manner similar to that which was described above. In particular, the end linkages 22, 23 may engage the apertures 624, 644 of the first and second plate members 620, 640 of the first and second attachment structures 605, 606. Of course, if it is desired to use the sensor apparatus 3000 with the first type of animal collar 10, then the first and second attachment structures 605, 606 of the adaptor assembly 600 is removed/separated from the housing 500 and then the first type of animal collar 10 is coupled directly to the housing 500 in the same manner as discussed above with reference to FIGS. 5A and 5B. Thus, the adaptor assembly 600 can be attached to and/or separated from the housing 500 depending on whether the first type of animal collar 10 or the second type of animal collar 20 is to be used.

Figure 16:
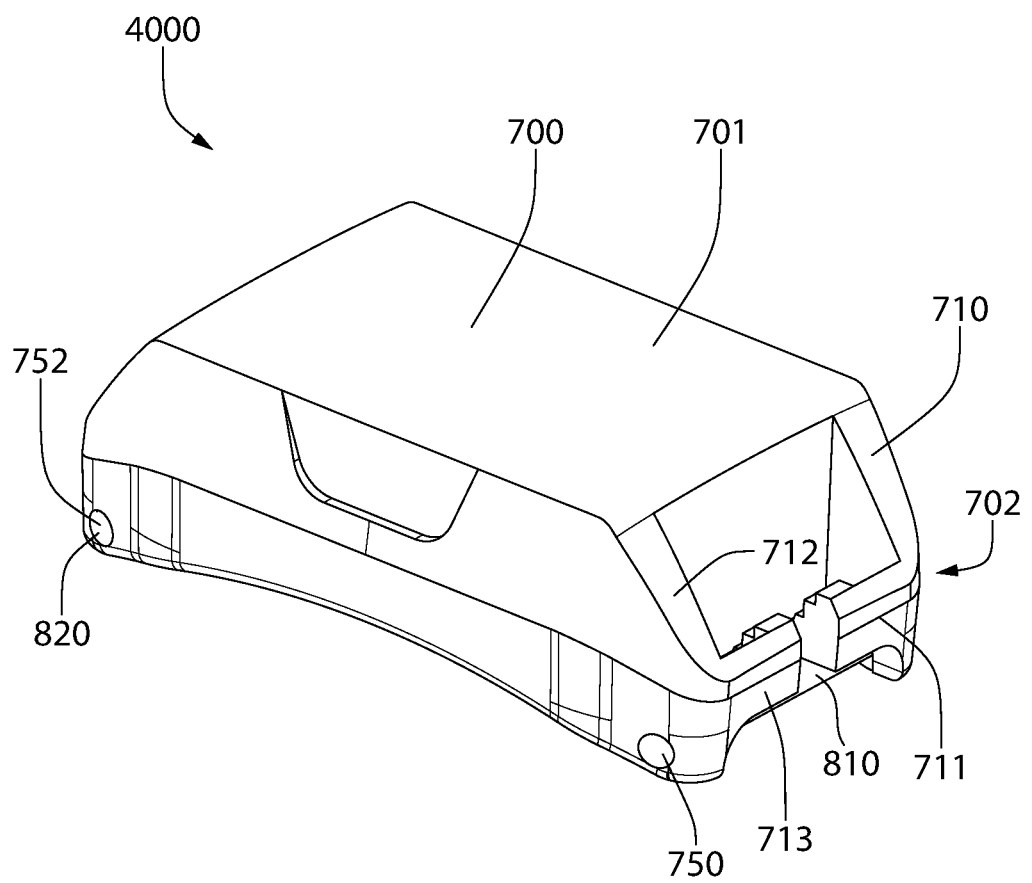
FIG. 16 is a perspective view of a sensor apparatus in accordance with still another embodiment of the present invention.
Figure 17:
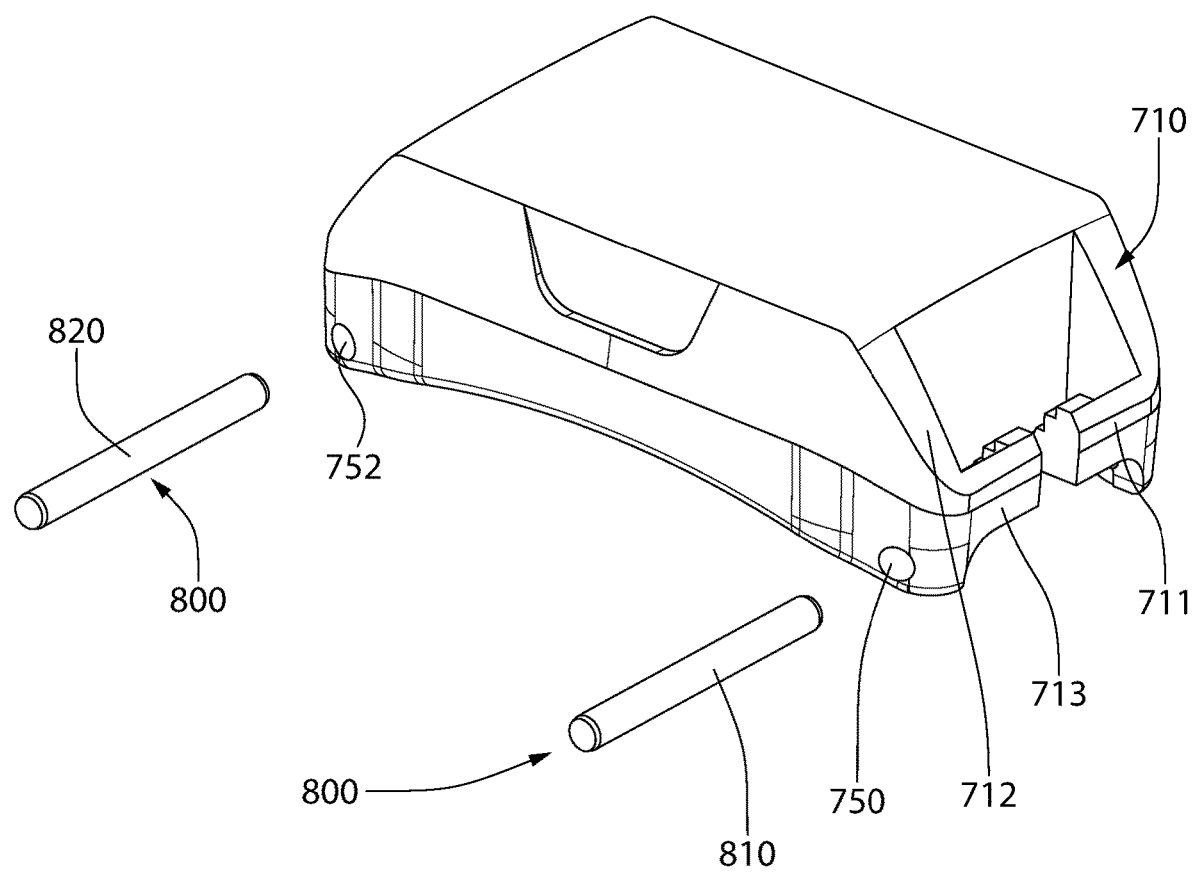
FIG. 17 is an exploded perspective view of the sensor apparatus of FIG. 16, illustrating a housing and an adaptor assembly thereof.
Figure 18:
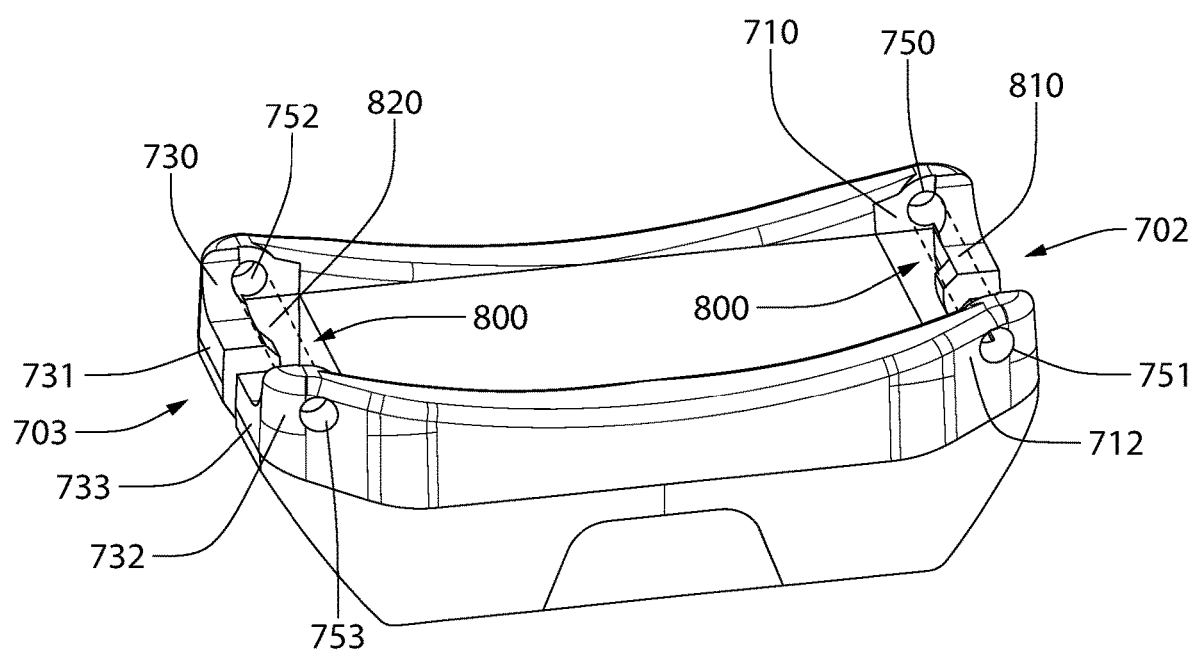
FIG. 18 is a bottom perspective view of the sensor apparatus of FIG. 16.

Referring to FIGS. 16-18, another embodiment of a sensor apparatus 4000 is illustrated in accordance with an embodiment of the present invention. The sensor apparatus 4000 comprises a housing 700 and an adaptor assembly 800 that is configured to be coupled to the housing 700. The housing 700 is identical to the housing 100 except for the differences described herein. Thus, the description of the housing 100 is applicable to the housing 700 with the minor modifications described herein which are intended to facilitate coupling of the adaptor assembly 800 to the housing 700.

In this embodiment, the housing 700 includes a main body 701 and a connection feature which includes a first connector 702 on a first side of the main body 701 and a second connector 703 on a second side of the main body 701. The first connector 702 comprises first and second flanges 710, 712 and first and second arms 711, 713 on the first side of the main body 701. The second connector 703 comprises third and fourth flanges 730, 732 and third and fourth arms 731, 733 on the second side of the main body 701. The modification of the housing 700 as compared to the housing 100 is the addition of a first hole 750 extending through the first flange 710, a second hole 751 extending through the second flange 712, a third hole 752 extending through the third flange 730, and a fourth hole 753 extending through the fourth flange 732.

The adaptor assembly 800 comprises a first rod 810 and a second rod 820. Each of the first and second rods 810, 820 are elongated cylinder-shaped structures. The first rod 810 has end portions that are located within the first and second holes 750, 751 and the rest of the first rod 810 spans across the first nesting region. The first rod 810 may extend across the first nesting region at a location below the first and second arms 711, 713. The second rod 820 has end portions that are located within the third and fourth holes 752, 753. The rest of the second rod 820 spans across the second nesting region. The second rod 820 may extend across the second nesting region at a location below the third and fourth arms 731, 733.

Figure 19:
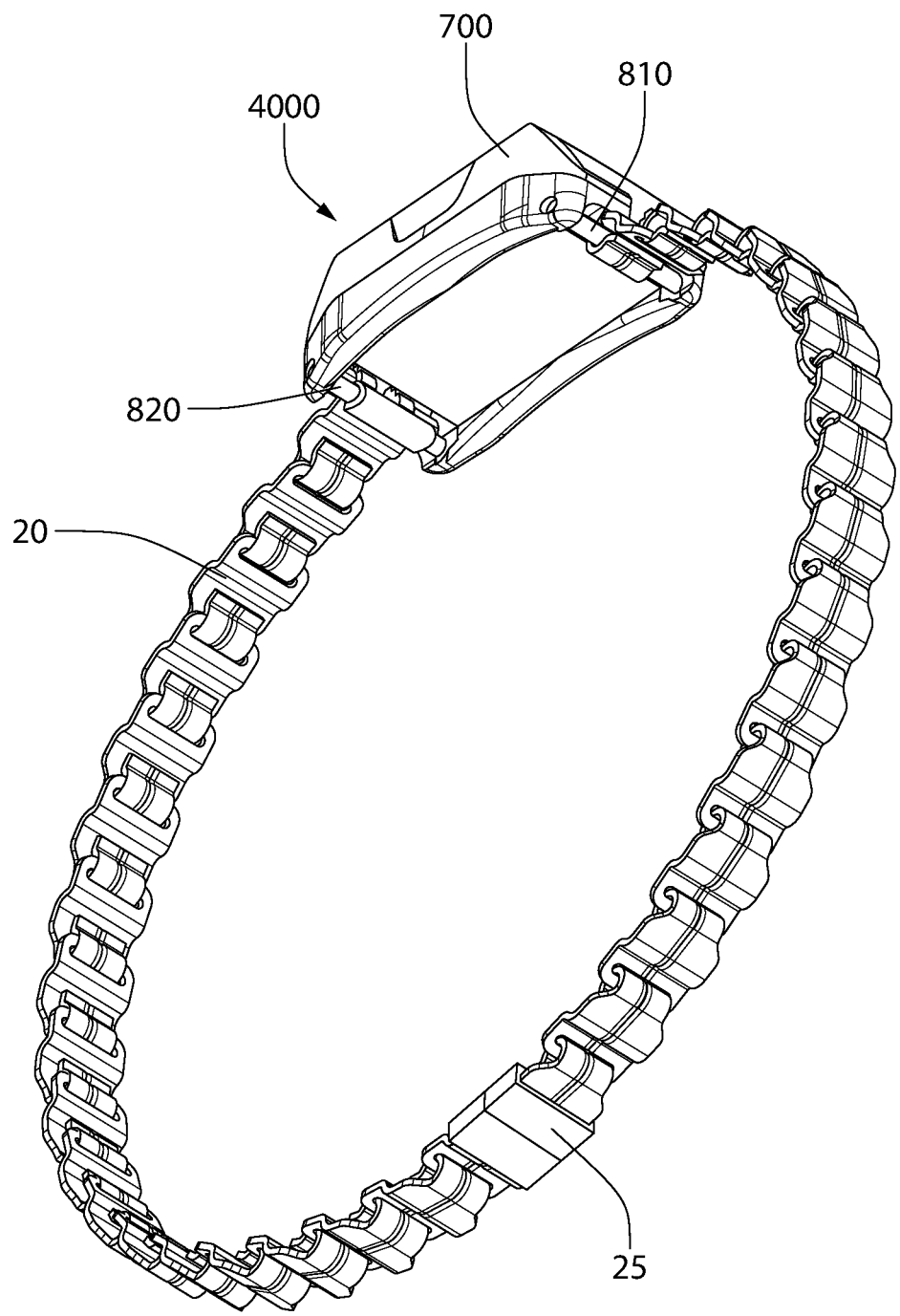
FIG. 19 is a perspective view of the sensor apparatus of FIG. 16 coupled to the second type of animal collar.

FIG. 19 illustrates the second type of collar 20 coupled to the first and second rods 810, 820 of the adaptor assembly 800 of the sensor apparatus 4000. In this embodiment, it may also be possible to couple the sensor apparatus 4000 to the first type of collar 10 using the connection features of the housing 700 even while the adaptor assembly 800 is coupled to the housing 700. That is, the adaptor assembly 800 may not impede the ability of attaching the first type of collar 10 to the housing 700 in the manner described above with reference to FIGS. 5A and 5B.

Figure 20:
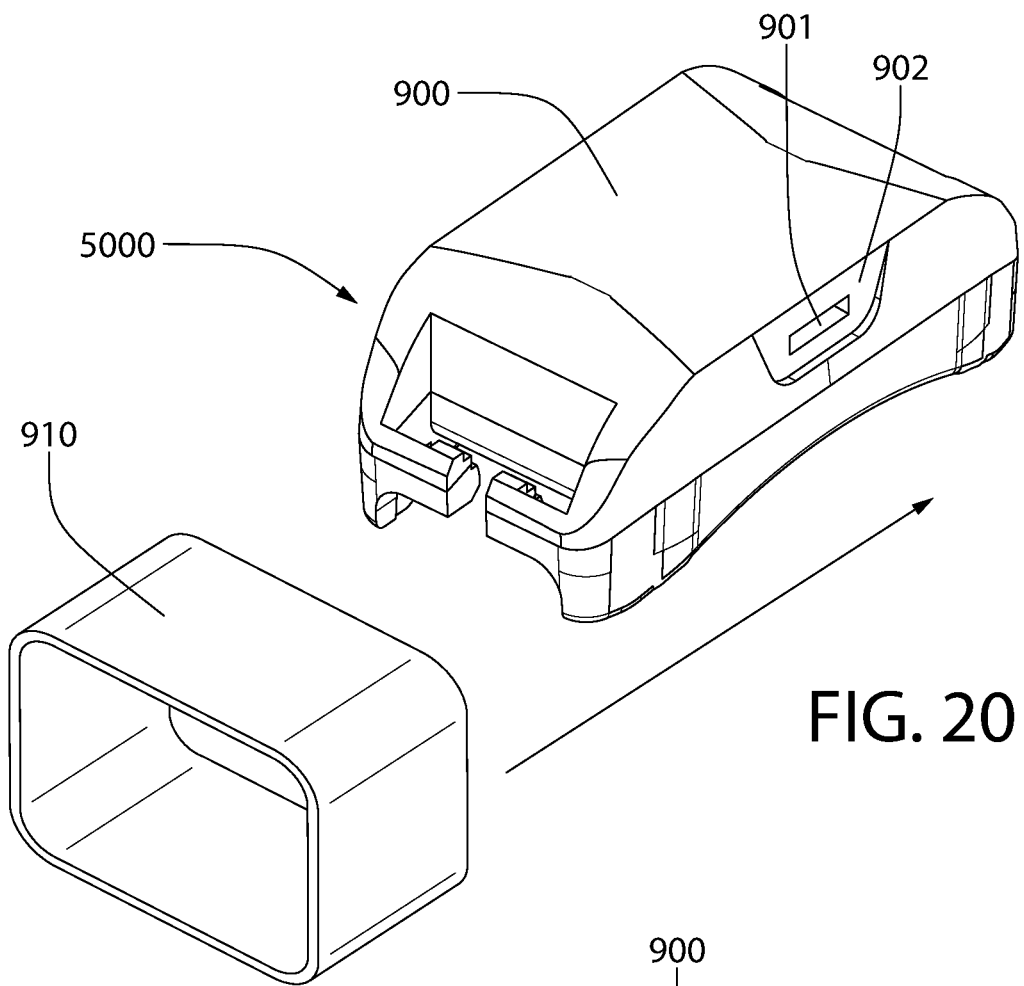
FIGS. 20 and 21 illustrate a housing of a sensor apparatus and a band which may be coupled thereto to cover a charging port thereof in accordance with one embodiment of the present invention.
Figure 21:
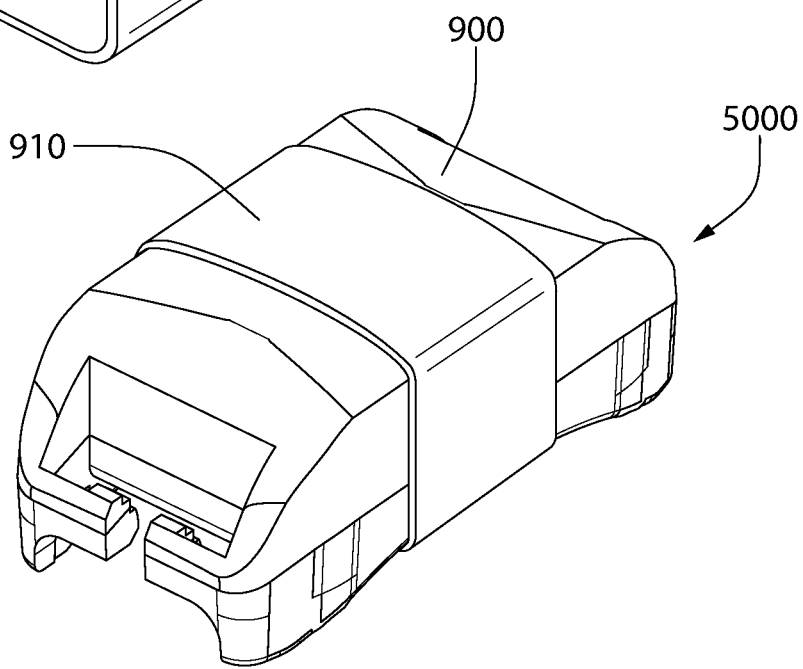

Referring to FIGS. 20 and 21, a sensor apparatus 5000 is illustrated. The sensor apparatus 5000 comprises a housing 900 containing an electrical circuit as described previously. The housing 900 is identical to the housing 100, except that there is a charging port 901 located on the exterior of the housing 900. The charging port 901 may be a USB port or any other type of port intended to accept a charging adaptor plug. The charging port 901 may be located within a recess 902 formed in the housing 900.

The sensor apparatus 5000 further comprises a band 910 that is configured to fit around the housing 900 to cover the charging port 901. The band may be formed from an elastomeric material, such as silicone. The band 910 may have a color that is outside of the visible spectrum of dogs. For example without limitation, the band 910 may be magenta, red, or cyan. The band 910 may be a loop-shaped structure that can wrap fully around a portion of the housing 900 when coupled thereto. Thus, the band 910 may be configured to cover the charging port 901 when the band 910 is coupled to the housing 900. The band 910 may include a nub designed to fit into the charging port 901 to hold the band in place 910 and keep debris out of the charging port 901. The band 910 may be elastomeric so as to be stretchy enough to fit around the housing 900 but stable enough to be able to slide along the housing 900 to expose the charging port 901 when charging is desired.

Figure 22:
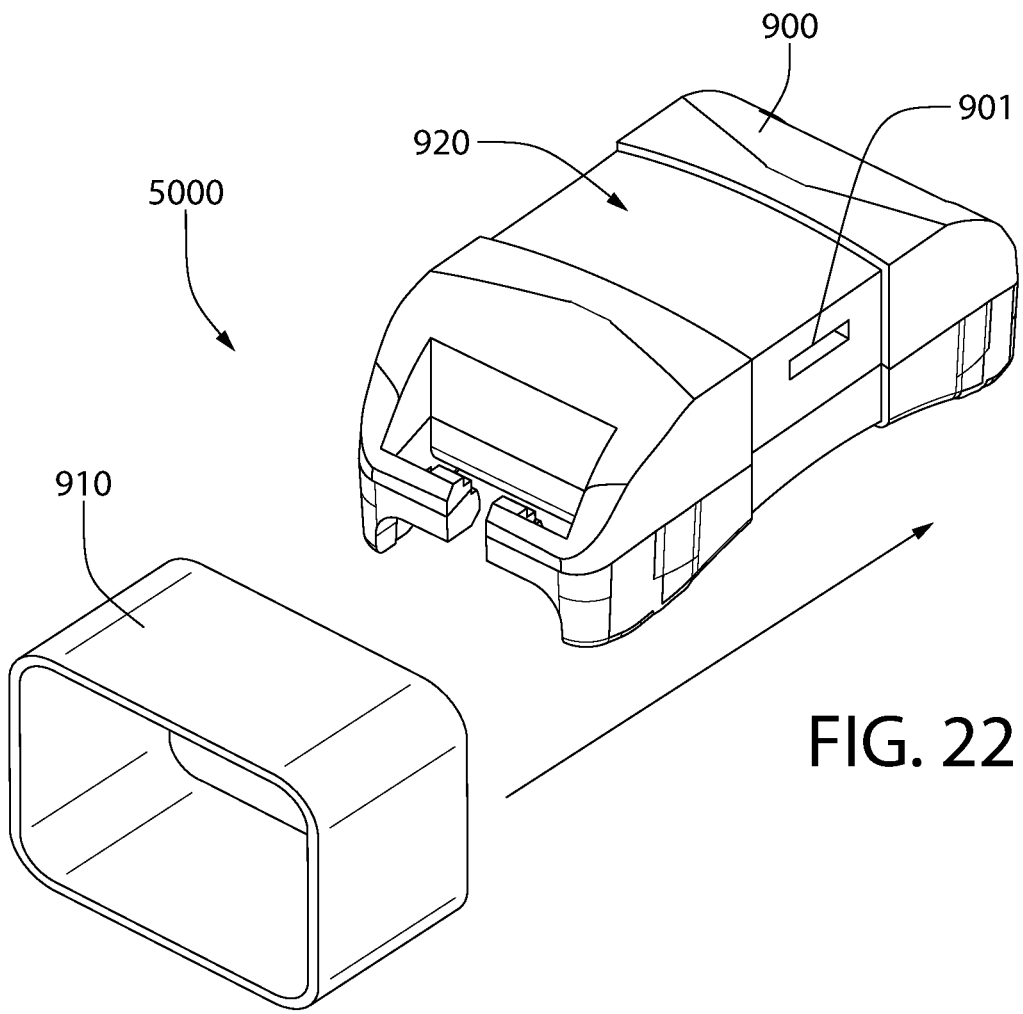
FIGS. 22 and 23 illustrate a housing of a sensor apparatus and a band which may be coupled thereto to cover a charging port thereof in accordance with another embodiment of the present invention.
Figure 23:
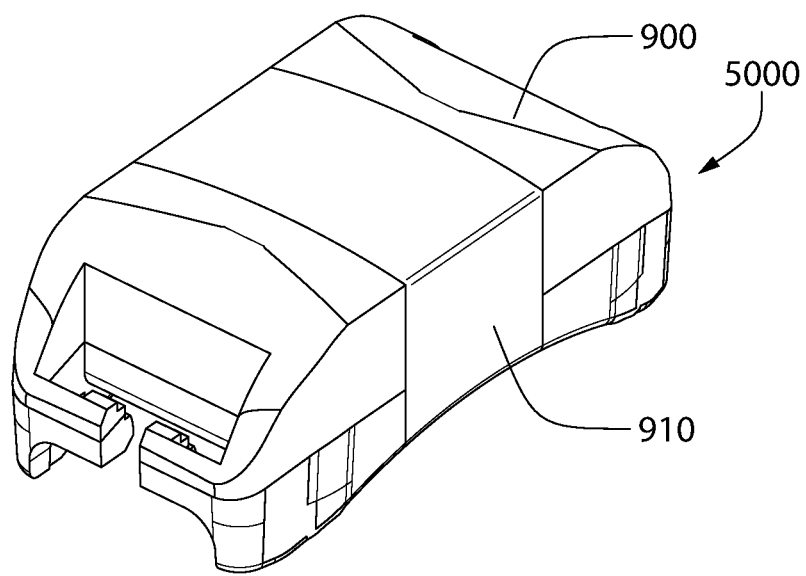

FIGS. 22 and 23 illustrate the sensor apparatus 5000 with a minor modification to the housing 900. In particular, the housing 900 comprises an annular recess 920 where the band 910 is intended to be placed when the band 910 is coupled to the housing 900. Thus, when the band 900 is coupled to the housing 900 with this modification, the outer surface of the band 910 is flush with the outer surface of the housing 900. This results in a seamless aesthetic for the finished product. The band 910 as shown in FIGS. 21-24 may be incorporated into any embodiment of the sensor apparatus as described herein.

While the inventions have been described with respect to specific examples including presently preferred modes of carrying out the inventions, those skilled in the art will appreciate that there are numerous variations and permutations of the above described systems and techniques. It is to be understood that other embodiments may be utilized and structural and functional modifications may be made without departing from the scope of the present inventions. Thus, the spirit and scope of the inventions should be construed broadly as set forth in the appended claims.

What is claimed is:

1. A sensor apparatus configured for attachment to a collar worn by an animal, the sensor apparatus comprising:
   a sensor assembly comprising:
      a housing comprising a first connection feature configured for coupling the sensor assembly to a first type of animal collar, the housing defining a cavity; and
      an electronic circuit located within the cavity of the housing, wherein the electronic circuit is configured to at least one of store information and collect data; and
   an adaptor assembly configured to be coupled to the sensor assembly, the adaptor assembly comprising a second connection feature configured for coupling the sensor apparatus to a second type of animal collar that is different from the first type of animal collar.

2. The sensor apparatus according to claim 1 wherein the first connection feature is integral with the housing, and wherein when the adaptor assembly is coupled to the housing, the first connection feature is inaccessible for coupling the sensor apparatus to the first type of animal collar.

3. The sensor apparatus according to claim 1 wherein the electronic circuit comprises a power source and at least one sensor for collecting data related to the animal.

4. The sensor apparatus according to claim 1 wherein the second type of animal collar is formed from metal and the first type of animal collar is not formed from metal, wherein the first type of animal collar is formed from a material selected from the group consisting of nylon, polyester, neoprene, rubber, elastomer, and leather.

5. The sensor apparatus according to claim 1 wherein the housing comprises a charging port for charging a power source of the electronic circuit, and further comprising a band coupled to the housing to cover the charging port, wherein the band is movable relative to the housing to expose the charging port for charging of the power source.

6. The sensor apparatus according to claim 5 wherein the band is formed from an elastomeric material and wherein the band wraps around a portion of the housing.

7. The sensor apparatus according to claim 1 wherein the housing comprises a main body portion having a first end and a second end, wherein the first connection feature comprises a first arm structure that is spaced apart from the first end of the main body portion of the housing by a first nesting region and a second arm structure that is spaced apart from the second end of the main body portion of the housing by a second nesting region.

8. The sensor apparatus according to claim 7 wherein the adaptor assembly comprises:
    a first plug configured for insertion into the first nesting region;
    a second plug configured for insertion into the second nesting region; and
    a bracket configured to be coupled to either: (1) each of the first and second plugs;
or (2) the housing; and
    wherein the bracket comprises the second connection feature.

9. The sensor apparatus according to claim 7 wherein the adaptor assembly comprises:
    a first rod extending across the first nesting region at a position between the first arm structure and a bottom end of the housing; and
    a second rod extending across the second nesting region at a position between the second arm structure and the bottom end of the housing; and
    wherein the second type of animal collar is configured to engage the first and second rods to couple the sensor apparatus to the second type of animal collar.

10. The sensor apparatus according to claim 7 further comprising:
    wherein the first connection feature comprises:
        a first flange and a second flange extending from the first end of the main body portion of the housing and having inner surfaces that face one another, the first arm structure extending between the first and second flanges;
        a third flange and a fourth flange extending from the second end of the main body portion of the housing and having inner surfaces that face one another, the second arm structure extending between the third and fourth flanges; and
        wherein the inner surfaces of each of the first, second, third, and fourth flanges comprises a slot; and
    wherein the adaptor assembly comprises:
        a first pin disposed within the slots of the first and second flanges and extending across the first nesting region; and
        a first plate member coupled to the first pin and at least partially located within the first nesting region, the first plate member comprising a first aperture;
        a second pin disposed within the slots of the third and fourth flanges and extending across the second nesting region; and
        a second plate member coupled to the second pin and at least partially located within the second nesting region, the second plate member comprising a second aperture; and
    wherein the second type of animal collar is configured to mate with the first and second apertures to couple the sensor apparatus to the second type of animal collar.

11. The sensor apparatus according to claim 10 wherein the first plate member is pivotable relative to the first pin within the first nesting region and the second plate member is pivotable relative to the second pin within the second nesting region.

12. The sensor apparatus according to claim 1 further comprising:
    the housing comprising a main body portion having a first end and a second end;
    the first connection feature comprising:
        a first connector extending from the first end of the main body portion so that a first nesting region is defined between the first connector of the first connection feature and the first end of the housing; and
        a second connector extending from the second end of the main body portion so that a second nesting region is defined between the second connector of the first connection feature and the second end of the housing; and
    wherein when the sensor apparatus is coupled to the first type of animal collar, a first portion of the first type of animal collar nests within the first nesting region, a second portion of the first type of animal collar nests within the second nesting region, and a third portion of the first type of animal collar located between the first and second portions of the first type of animal collar extends along a bottom of the housing.

13. The sensor apparatus according to claim 12 wherein the adaptor assembly comprises:
    a first plug configured for insertion into the first nesting region;
    a second plug configured for insertion into the second nesting region; and
    a bracket configured to be coupled to either: (1) each of the first and second plugs;
or (2) the housing; and
    wherein the bracket comprises the second connection feature.

14. The sensor apparatus according to claim 13 wherein the bracket comprises a plate member that is adjacent to a bottom of the housing when the adaptor assembly is coupled to the housing, a first connector portion extending obliquely from a first side edge of the plate member and comprising a first aperture, and a second connector portion extending obliquely from a second side edge of the plate member and comprising a second aperture, wherein the second type of animal collar is configured to mate with the first and second apertures to couple the sensor apparatus to the second type of animal collar.

15. The sensor apparatus according to claim 13 further comprising:
    wherein the first connector comprises:
        a first flange extending from the first end of the main body portion adjacent to a front of the main body portion;

a second flange extending from the first end of the main body portion adjacent to a rear of the main body portion;

a first arm extending from the first flange towards the second flange, the first arm terminating in a first distal end; and a second arm extending from the second flange towards the first flange, the second arm terminating in a second distal end that is spaced apart from the first distal end by a first gap; and wherein the second connector comprises:

a third flange extending from the second end of the main body portion adjacent to the front of the main body portion;

a fourth flange extending from the second end of the main body portion adjacent to the rear of the main body portion;

a third arm extending from the third flange towards the fourth flange, the third arm terminating in a third distal end; and a fourth arm extending from the fourth flange towards the third flange, the fourth arm terminating in a fourth distal end that is spaced apart from the third distal end by a second gap.

16. The sensor apparatus according to claim 15 wherein the first plug comprises a first body portion that nests within the first nesting region and a first protrusion that nests within the first gap and wherein the second plug comprises a second body portion that nests within the second nesting region and a second protrusion that nests within the second gap.

17. A wearable animal information apparatus comprising:
a sensor apparatus comprising:
a housing comprising a first connection feature;
an adaptor assembly configured to be coupled to the housing, the adaptor assembly comprising a second connection feature; and
an electronic circuit located within a cavity of the housing, wherein the electronic circuit is configured to at least one of store information and collect data;
a first type of collar configured to be coupled to the sensor apparatus utilizing the first connection feature of the housing, wherein the first type of collar is incapable of attachment to the second connection feature of the adaptor assembly; and
a second type of collar configured to be coupled to the sensor apparatus utilizing the second connection feature of the adaptor assembly, wherein the second type of collar is incapable of attachment to the first connection feature of the housing.

18. The wearable animal information apparatus according to claim 17 wherein the first type of collar is prevented from being coupled to the sensor apparatus utilizing the first connection feature when the adaptor assembly is coupled to the housing.

19. The wearable animal information apparatus according to claim 17 wherein the first type of collar is formed from a material selected from the group consisting of nylon, polyester, neoprene, rubber, elastomer, and leather and wherein the second type of collar is formed from metal, wherein the first connection feature comprises a pair of nesting regions within which portions of the first type of collar are positioned when the first type of collar is coupled to the sensor apparatus utilizing the first connection feature of the housing, and wherein at least a portion of the adaptor assembly is located within the pair of nesting regions when the adaptor assembly is coupled to the housing.

20. The wearable animal information apparatus according to claim 17 wherein the first connection feature comprises a pair of nesting regions within which portions of the first type of collar are positioned when the first type of collar is coupled to the sensor apparatus utilizing the first connection feature of the housing, and wherein the adaptor assembly further comprises:

a first plug located within the first nesting region when the adaptor assembly is coupled to the housing;

a second plug located within the second nesting region when the adaptor assembly is coupled to the housing; and a bracket located along a bottom of the housing and configured to be coupled to either: (1) each of the first and second plugs; or (2) the housing; and wherein the bracket comprises the second connection feature.

* * * * *